United States Patent
Taniguchi et al.

(10) Patent No.: US 10,220,315 B2
(45) Date of Patent: Mar. 5, 2019

(54) MANAGEMENT APPARATUS, CONTROL METHOD THEREFOR, COMPUTER-READABLE RECORDING MEDIUM, APPLICATION SYSTEM, AND IDENTIFICATION-INFORMATION ASSOCIATING METHOD

(71) Applicant: KONAMI DIGITAL ENTERTAINMENT CO., LTD., Minato-ku, Tokyo (JP)

(72) Inventors: Takashi Taniguchi, Tokyo (JP); Yuji Osato, Tokyo (JP); Takaaki Kotera, Tokyo (JP)

(73) Assignee: KONAMI DIGITAL ENTERTAINMENT CO., LTD., Minato-Ku, Tokyo (JP)

( * ) Notice: Subject to any disclaimer, the term of this patent is extended or adjusted under 35 U.S.C. 154(b) by 734 days.

(21) Appl. No.: 14/553,530

(22) Filed: Nov. 25, 2014

(65) Prior Publication Data
US 2015/0081795 A1 Mar. 19, 2015

Related U.S. Application Data

(63) Continuation of application No. PCT/JP2013/064912, filed on May 29, 2013.

(30) Foreign Application Priority Data

May 31, 2012 (JP) .................................. 2012-124681

(51) Int. Cl.
G06F 15/16 (2006.01)
A63F 13/48 (2014.01)
(Continued)

(52) U.S. Cl.
CPC .............. *A63F 13/48* (2014.09); *A63F 13/35* (2014.09); *A63F 13/795* (2014.09); *G06Q 50/10* (2013.01);
(Continued)

(58) Field of Classification Search
CPC ... A63F 13/48; A63F 13/35795; G06Q 50/10; G06Q 10/00; H04L 12/1818;
(Continued)

(56) References Cited

U.S. PATENT DOCUMENTS 7,711,847 B2 * 5/2010 Dhupelia ................ A63F 13/12
463/30
8,145,245 B2 * 3/2012 Aula .................... H04L 12/1868
379/90.01
(Continued)

FOREIGN PATENT DOCUMENTS

JP 2007-206823 A 8/2007
JP 2008-046911 A 2/2008
(Continued)

OTHER PUBLICATIONS

International Search Report of PCT/JP2013/064912 dated Jul. 2, 2013.
(Continued)

*Primary Examiner* — Joseph E Avellino
*Assistant Examiner* — Rachel J Hackenberg
(74) *Attorney, Agent, or Firm* — Sughrue Mion, PLLC

(57) ABSTRACT

A management server issues a game link identifier associated with friend network identification information corresponding to an inviting game and sends the game link identifier to a terminal apparatus corresponding to the friend network identification information. In the terminal apparatus, the game link identifier is passed from the inviting game to an invited game, and the program of the invited game
(Continued)

sends the passed game link identifier and identification information of an inviting user, corresponding to the invited game, to the management server. The management server searches already issued game link identifiers, and, when a game link identifier that matches the received game link identifier is found, associates friend network identification information corresponding to the invited game associated with the received game link identifier, with the friend network identification information corresponding to the inviting game associated with the issued game link identifier.

12 Claims, 19 Drawing Sheets

(51) Int. Cl.
  *G06Q 50/10* (2012.01)
  *A63F 13/35* (2014.01)
  *H04L 12/18* (2006.01)
  *A63F 13/795* (2014.01)

(52) U.S. Cl.
  CPC .... *H04L 12/1818* (2013.01); *A63F 2300/556* (2013.01); *A63F 2300/636* (2013.01)

(58) Field of Classification Search
  CPC ....... H04L 67/18; H04L 67/306; H04L 67/22; H04L 67/04; H04L 67/14; H04L 67/20; H04L 67/12; H04L 69/329; H04L 65/1063; H04L 65/1083; H04L 51/0465; H04W 12/06; H04W 4/003
  See application file for complete search history.

(56) References Cited

U.S. PATENT DOCUMENTS

| | | | |
|---|---|---|---|
| 2006/0121971 A1 | 6/2006 | Slomiany et al. | |
| 2011/0250971 A1* | 10/2011 | van Os | A63F 13/795 463/42 |
| 2012/0227094 A1* | 9/2012 | Begen | G06F 21/41 726/4 |
| 2013/0274001 A1* | 10/2013 | de Jesus | A63F 13/12 463/25 |

FOREIGN PATENT DOCUMENTS

| | | |
|---|---|---|
| JP | 2008-522744 A | 7/2008 |
| JP | 2009-037435 A | 2/2009 |
| KR | 101069315 B1 | 10/2011 |

OTHER PUBLICATIONS

Communication dated Aug. 14, 2017 (which is the publication date) from the United States Patent and Trademark Office in co-pending U.S. Appl. No. 14/521,607.

Communication dated Dec. 26, 2017, from the State Intellectual Property Office of People's Republic of China in counterpart Application No. 201380022067.9.

Communication dated Oct. 10, 2017, from State Intellectual Property Office of the P.R.C. in counterpart application No. 201380022067.9.

Notice of Allowance, dated Mar. 1, 2018, issued by the U.S. Patent and Trademark Office in U.S. Appl. No. 14/521,607.

* cited by examiner

TBL11

| ID | AppID | NICKNAME | FNWID |
|---|---|---|---|
| 1 | 00000001 | YUNISHIO | XCV56714 |
| 2 | 00000002 | MARICCHO | YUJ85224 |
| 3 | 00000003 | TAROBEH | 23150QWE |
| 4 | 00000002 | YASUPPE | REK35460 |
| 5 | 00000001 | TETSUJI | QWE75891 |
| ⋮ | ⋮ | ⋮ | ⋮ |

FIG. 5

TBL12

| ID | Group | AppID | LocalID_From | LocalID_To | FNWID_From | FNWID_To | St |
|----|-------|-------|--------------|------------|------------|----------|------|
| 1 | Freinds | 00000001 | 00000011 | 00003120 | XCV56714 | QWE75891 | 1 |
| 2 | Freinds | 00000002 | 00000123 | 00000011 | REK354602 | 23150QWE | 0 |
| 3 | Rival | 00000001 | 00003120 | 00000011 | QWE75891 | XCV56714 | null |
| 4 | Block | 00000002 | 00000123 | 00003120 | REK354602 | SCF55663 | null |
| 5 | Freinds | 00000001 | 00000011 | 00002221 | XCV56714 | KLY5711 | 2 |
| ... | ... | ... | ... | ... | ... | ... | ... |

FIG. 6

TBL13

| ID | Tg | AppID_From | AppID_To | InviteFNWID_From | InviteFNWID_To |
|---|---|---|---|---|---|
| 1 | 56844SAS | 00000005 | 00000001 | XCV56714 | QWE75891 |
| 2 | 25578SCB | 00000004 | 00000007 | REK354602 | 23150QWE |
| 3 | 125XXV12 | 00000001 | 00000002 | QWE75891 | SCF55663 |
| 4 | 9822JKL5 | 00000002 | 00000001 | REK354602 | NULL |
| 5 | 22169GRT | 00000003 | 00000001 | XCV56714 | NULL |
| ... | ... | ... | ... | ... | ... |

FIG. 7

TBL14

| ID | Tu | AppID_From | AppID_To | InviteFNWID_From | InviteFNWID_To | Name_From | Name_To | St | Date |
|---|---|---|---|---|---|---|---|---|---|
| 1 | 001xx0021 | 00000001 | 00000002 | XCV56714 | SDC89659 | KARUISHI | YAMAJI | 0 | 2012/05/18 |
| 2 | 001xx0022 | 00000001 | 00000002 | XCV56714 | POL45638 | KARUISHI | JEEK | 0 | 2012/05/18 |
| 3 | 001xx0023 | 00000001 | 00000002 | XCV56714 | DFG78410 | KARUISHI | KURESON | 0 | 2012/05/18 |
| 4 | 011xy3330 | 00000002 | 00000001 | REK354602 | ASD123320 | MASA | MARINE | 5 | 2012/05/01 |
| 5 | 014yy3357 | 00000003 | 00000001 | XCV56714 | JKH565410 | SAWA | FUKURO | 2 | 2012/04/30 |
| ... | ... | ... | ... | ... | ... | ... | ... | ... | ... |

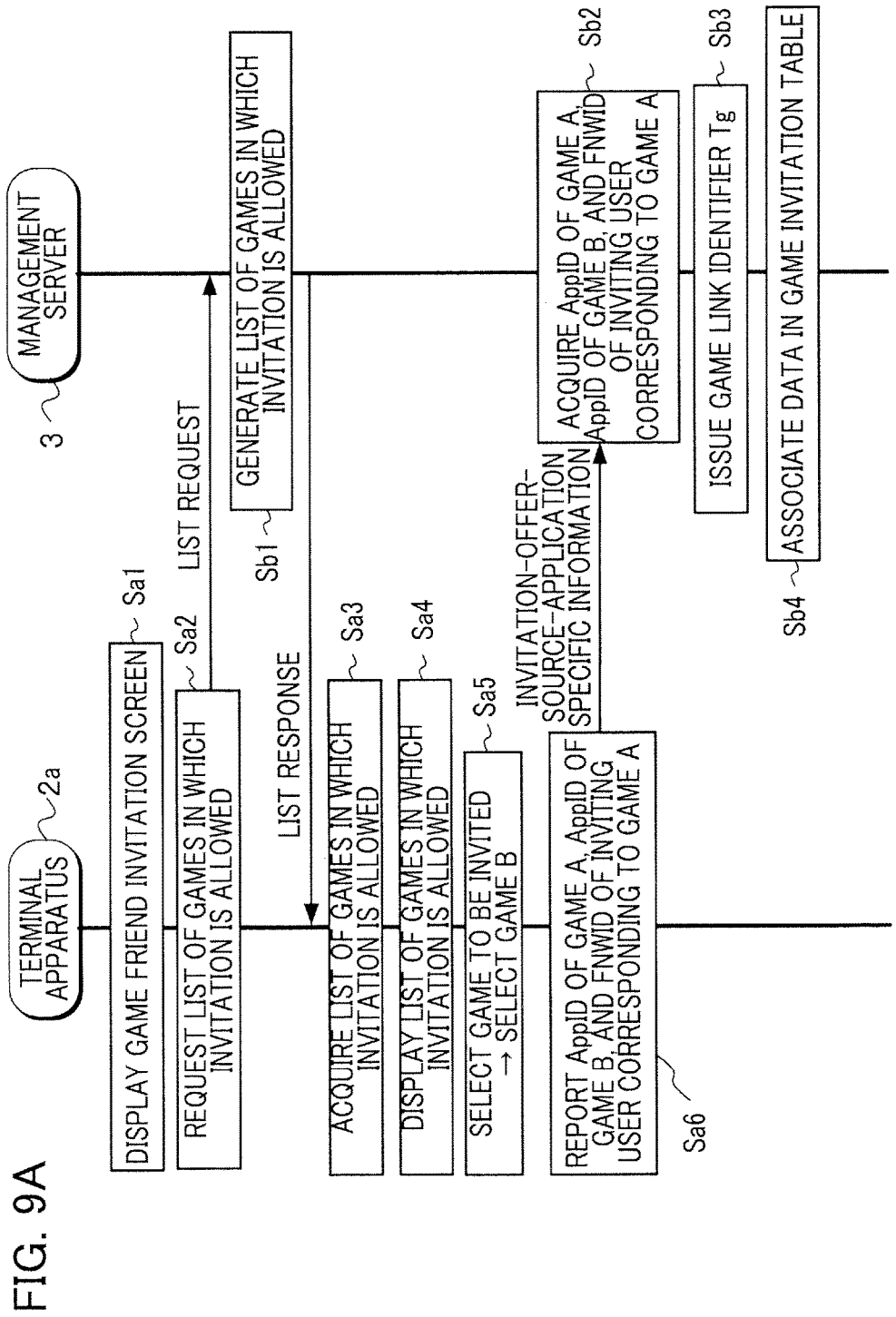

FIG. 11A

TBL13

| ID | Tg | AppID_From | AppID_To | InviteFNWID_From | InviteFNWID_To |
|----|----|----|----|----|----|
| 1 | 56844SAS | 00000001 | 00000002 | XCV56714 | Null |
| ⋮ | ⋮ | ⋮ | ⋮ | ⋮ | ⋮ |

FIG. 11B

TBL13

| ID | Tg | AppID_From | AppID_To | InviteFNWID_From | InviteFNWID_To |
|----|----|----|----|----|----|
| 1 | 56844SAS | 00000001 | 00000002 | XCV56714 | QWE75891 |
| ⋮ | ⋮ | ⋮ | ⋮ | ⋮ | ⋮ |

FIG. 14

TBL14

(A)

| ID | Tu | AppID_From | AppID_To | InviteFNWID_From | InviteFNWID_To | Name | St | Date |
|---|---|---|---|---|---|---|---|---|
| 2 | 001xx0022 | 00000001 | 00000002 | XCV56714 | POL45638 | KARUISHI | 0 | 2012/05/18 |

⇩

(B)

| ID | Tu | AppID_From | AppID_To | InviteFNWID_From | InviteFNWID_To | Name | St | Date |
|---|---|---|---|---|---|---|---|---|
| 2 | 001xx0022 | 00000001 | 00000002 | XCV56714 | POL45638 | KARUISHI | 1 | 2012/05/18 |

⇩

(C)

| ID | Tu | AppID_From | AppID_To | InviteFNWID_From | InviteFNWID_To | Name | St | Date |
|---|---|---|---|---|---|---|---|---|
| 2 | 001xx0022 | 00000001 | 00000002 | XCV56714 | POL45638 | KARUISHI | 2 | 2012/05/18 |

⇩

(D)

| ID | Tu | AppID_From | AppID_To | InviteFNWID_From | InviteFNWID_To | Name | St | Date |
|---|---|---|---|---|---|---|---|---|
| 2 | 001xx0022 | 00000001 | 00000002 | XCV56714 | POL45638 | KARUISHI | 4 | 2012/05/18 |

⇩

(E)

| ID | Tu | AppID_From | AppID_To | InviteFNWID_From | InviteFNWID_To | Name | St | Date |
|---|---|---|---|---|---|---|---|---|
| 2 | 001xx0022 | 00000001 | 00000002 | XCV56714 | POL45638 | KARUISHI | 5 | 2012/05/18 |

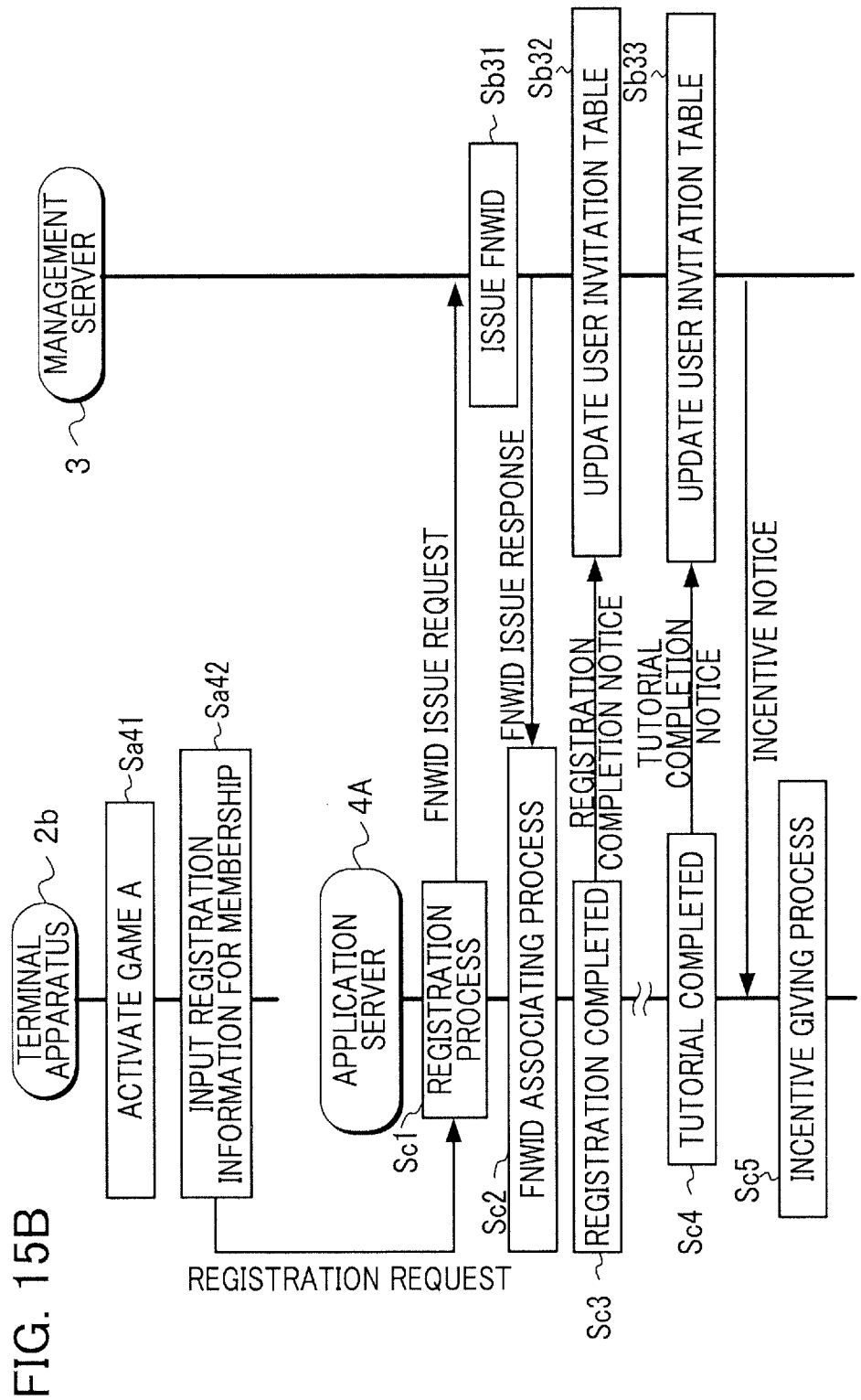

MANAGEMENT APPARATUS, CONTROL METHOD THEREFOR, COMPUTER-READABLE RECORDING MEDIUM, APPLICATION SYSTEM, AND IDENTIFICATION-INFORMATION ASSOCIATING METHOD

CROSS REFERENCE TO RELATED APPLICATIONS

This application is a Continuation Application of PCT Application No. PCT/JP2013/064912, filed May 29, 2013, and is based on and claims the benefit of priority from prior Japanese Patent Application No. 2012-124681, filed May 31, 2012, the entire contents of both of which are incorporated herein by reference.

TECHNICAL FIELD

The present invention relates to a technology for associating identification information that manages a plurality of individually provided applications.

BACKGROUND ART

In recent years, services that provide applications on the Internet have rapidly become widespread. As one example of this type of service, the SNS (Social Network Service) provides applications such as games for members, who are site users. The SNS manages membership information that identifies the members. The same user has different identification information (hereafter called an account) in different applications. The SNS associates these accounts with the membership information so as to be able to provide connected services related to a plurality of applications (see Patent Document 1, for example)

CITATION LIST

Patent Document

Patent Document 1: Unexamined Japanese Patent Application Publication No. 2007-206823

SUMMARY OF THE INVENTION

Technical Problem

There are applications that do not rely on the SNS and that can be used by persons who are not members of the SNS (hereafter sometimes called general applications). Even in such general applications, the same user has incompatible accounts. Therefore, connected services related to a plurality of general applications cannot be provided to the users.

On the other hand, each user can use a plurality of general applications with one terminal apparatus. To collectively manage the user accounts of these plurality of general applications, a management server that combines the accounts is required, as in SNS platform systems.

To introduce such a management server, however, it is necessary to set up a new management-server account for each user and also to associate the accounts corresponding to the plurality of general applications in the management server. Therefore, each user needs to manage the new management-server account in addition to the existing accounts.

In consideration of the above situations, an object of the present invention is to provide a management apparatus that can associate a plurality of accounts provided by a plurality of general applications that do not rely on the SNS, without having to set up a new management-server account managed by each user.

Solution to Problem

Means employed by the present invention to achieve the above-described object will be described below.

To achieve the foregoing object, in one aspect, the present invention provides a management apparatus that manages type information of each of a plurality of applications to be managed and that can communicate with a terminal apparatus of a user. The management apparatus includes an invitation-offer-source-application specific information acquiring unit configured to acquire, from an inviting application used in a terminal apparatus of an inviting user, invitation-offer-source-application specific information that includes type information specifying the inviting application and identification information of the inviting user, the identification information corresponding to the inviting application; an issuing unit configured to issue an application link identifier associated with the invitation-offer-source-application specific information; an identifier reporting unit configured to report the application link identifier issued by the issuing unit to the inviting application used in the terminal apparatus of the inviting user; an invitation-offer-destination-application specific information acquiring unit configured to acquire, from an invited application, invitation-offer-destination-application specific information that includes the application link identifier passed from the inviting application to the invited application, type information specifying the invited application, and identification information of the inviting user, the identification information corresponding to the invited application; and a management unit configured to manage, in association with each other, the identification information of the inviting user, corresponding to the inviting application, and the identification information of the inviting user, corresponding to the invited application, for which the application link identifier issued by the issuing unit matches the application link identifier acquired by the invitation-offer-destination-application specific information acquiring unit.

In another aspect, the present invention provides an application system that includes a management apparatus that manages type information of each of a plurality of applications to be managed; and a terminal apparatus of a user. The management apparatus includes an invitation-offer-source-application specific information acquiring unit configured to acquire, from an inviting application used in a terminal apparatus of an inviting user, invitation-offer-source-application specific information that includes type information specifying the inviting application and identification information of the inviting user, the identification information corresponding to the inviting application; an issuing unit configured to issue an application link identifier associated with the invitation-offer-source-application specific information; an identifier reporting unit configured to report the application link identifier issued by the issuing unit to the inviting application used in the terminal apparatus of the inviting user; an invitation-offer-destination-application specific information acquiring unit configured to acquire, from an invited application, invitation-offer-destination-application specific information that includes the application link identifier passed from the inviting application to the invited application, type information specifying the invited application, and identification information of the inviting user, the identification information corresponding to the invited application; and a management unit configured to manage, in association with each other, the identification information of the inviting user, corresponding to the inviting application, and the identification information of the inviting user, corresponding to the invited application, for which the application link identifier issued by the issuing unit matches the application link identifier acquired by the invitation-offer-destination-application specific information acquiring unit. The terminal apparatus includes an invitation-offer-source-application specific information sending unit configured to send to the management apparatus the invitation-offer-source-application specific information generated by the inviting application used in the terminal apparatus of the inviting user; an activation unit configured to acquire the application link identifier reported from the management apparatus and that activates the invited application so as to pass the application link identifier from the inviting application to the invited application; and an invitation-offer-destination-application specific information sending unit configured to send to the management apparatus the invitation-offer-destination application specific information that includes the application link identifier acquired from the inviting application.

In still another aspect, the present invention provides a control method for a management apparatus that manages type information of each of a plurality of applications to be managed and that can communicate with a terminal apparatus of a user. The control method includes acquiring, from an inviting application used in a terminal apparatus of an inviting user, invitation-offer-source-application specific information that includes type information specifying the inviting application and identification information of the inviting user, the identification information corresponding to the inviting application; issuing an application link identifier associated with the invitation-offer-source-application specific information; reporting the issued application link identifier to the inviting application used in the terminal apparatus of the inviting user; acquiring, from an invited application, invitation-offer-destination-application specific information that includes the application link identifier passed from the inviting application to the invited application, type information specifying the invited application, and identification information of the inviting user, the identification information corresponding to the invited application; and managing, in association with each other, the identification information of the inviting user, corresponding to the inviting application, and the identification information of the inviting user, corresponding to the invited application, for which the issued application link identifier matches the acquired application link identifier.

In yet another aspect, the present invention provides a computer-readable recording medium having recorded thereon a program for a management apparatus that manages type information of each of a plurality of applications to be managed, that can communicate with a terminal apparatus of a user, and that includes a computer. The program makes the computer execute an invitation-offer-source-application specific information acquiring process of acquiring, from an inviting application used in a terminal apparatus of an inviting user, invitation-offer-source-application specific information that includes type information specifying the inviting application and identification information of the inviting user, the identification information corresponding to the inviting application; an issuing process of issuing an application link identifier associated with the invitation-offer-source-application specific information; an identifier reporting process of reporting the application link identifier issued in the issuing process to the inviting application used in the terminal apparatus of the inviting user; an invitation-offer-destination-application specific information acquiring process of acquiring, from an invited application, invitation-offer-destination-application specific information that includes the application link identifier passed from the inviting application to the invited application, type information specifying the invited application, and identification information of the inviting user, the identification information corresponding to the invited application; and a management process of managing, in association with each other, the identification information of the inviting user, corresponding to the inviting application, and the identification information of the inviting user, corresponding to the invited application, for which the application link identifier issued in the issuing process matches the application link identifier acquired in the invitation-offer-destination-application specific information acquiring process.

In another aspect, the present invention provides an identification-information associating method in a management apparatus that manages type information of each of a plurality of applications to be managed and that can communicate with a terminal apparatus of a user. The identification-information associating method includes acquiring, from a first application (inviting application) installed in a terminal apparatus used by a first user (inviting user), first information (invitation-offer-source-application specific information) that includes type information specifying the first application and identification information of the first user (inviting user), the identification information corresponding to the first application; issuing an application link identifier associated with the first information; reporting the issued application link identifier to the first application (inviting application) used by the first user (inviting user); acquiring second information (invitation-offer-destination-application specific information) that includes the application link identifier passed from the first application (inviting application) to a second application (invited application) installed in the terminal apparatus, type information specifying the second application (invited application), and identification information of the first user (inviting user), the identification information corresponding to the second application (invited application), from the second application (invited application); and managing, in association with each other, the identification information of the first user (inviting user), corresponding to the first application (inviting application), and the identification information of the first user, corresponding to the second application (invited application), for which the issued application link identifier matches the acquired application link identifier.

BRIEF DESCRIPTION OF THE DRAWINGS

FIG. 5 is a view showing an example data structure of a friendship relation table.

FIG. 6 is a view showing an example data structure of a game invitation table.

FIG. 7 is a view showing an example data structure of a user invitation table.

FIG. 9A is a sequence chart showing details of processing at an inviting user side.

FIG. 11A is a view showing an example record recorded in the game invitation table.

FIG. 11B is a view showing another example record recorded in the game invitation table.

FIG. 14 is a view showing example records recorded in the user invitation table.

FIG. 15B is a sequence chart showing details of the processing at the side of the user to be invited.

DESCRIPTION OF EMBODIMENTS

An application system using a management server according to an embodiment of the present invention will be described below with reference to the drawings.

1. Structure of Application System

Figure 1A:
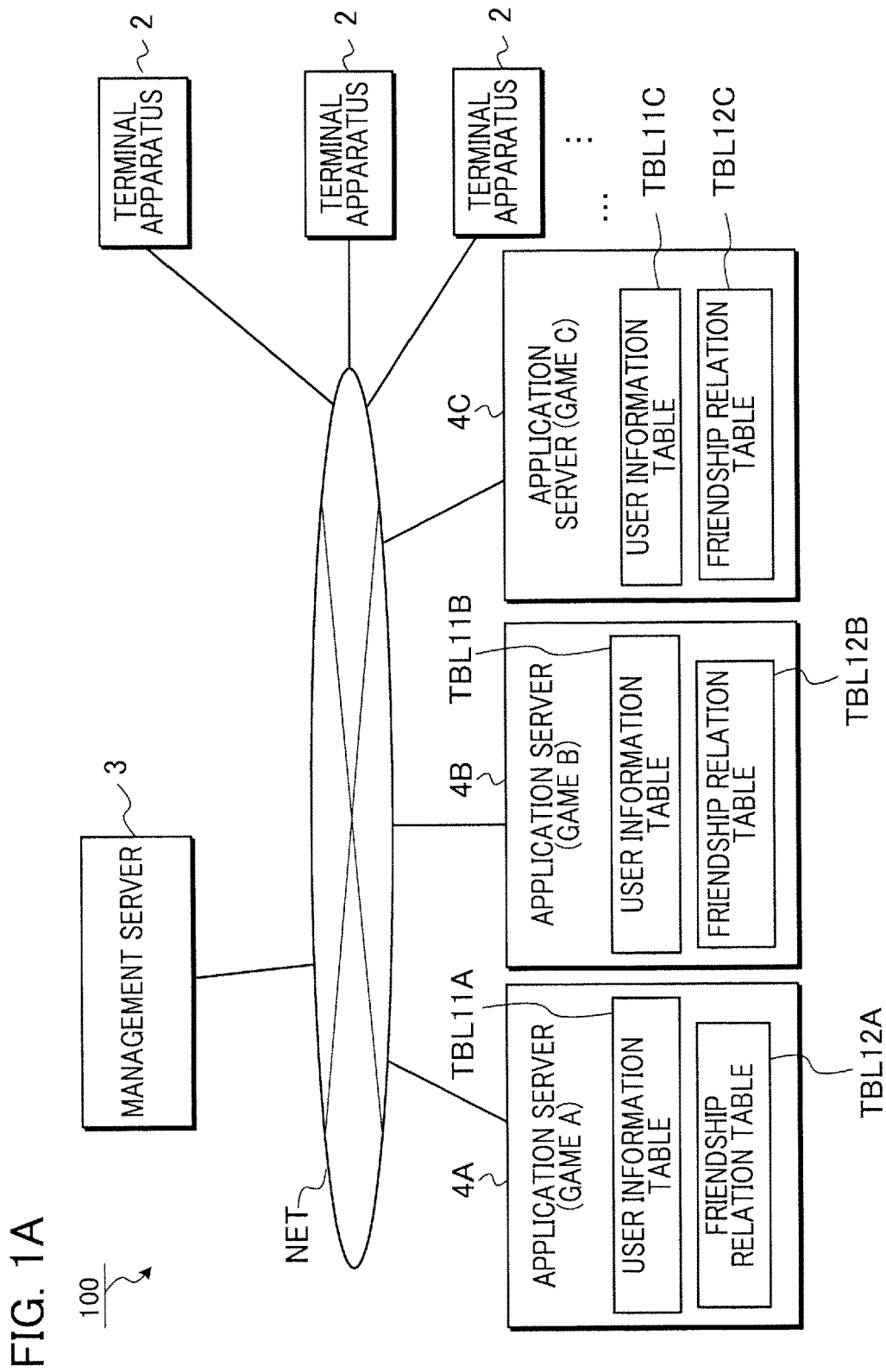
FIG. 1A is a block diagram of an application system according to an embodiment of the present invention.

FIG. 1A is a block diagram of an application system 100 according to an embodiment of the present invention. The application system 100 includes a communication network NET such as the Internet, user terminal apparatuses 2, a management server 3, and application servers 4A, 4B, 4C, . . . . The management server 3 manages pieces of type information of a plurality of applications to be managed (hereafter called target applications). The application servers 4A, 4B, 4C, . . . corresponding to the target applications independently manage user accounts and provide the users with individual services by using the corresponding target applications. In this example, the application servers 4A, 4B, 4C, . . . provide game A, game B, game C, . . . , respectively, as individual services. Game A, game B, game C, . . . can be browser games provided by browsers, but, in this example, it is assumed that the programs of game A, game B, game C, . . . are downloaded into user terminal apparatuses 2, are installed in the terminal apparatuses 2, and are executed thereon. In this case, the application servers 4A, 4B, 4 C, . . . manage game data of users of game A, game B, game C, . . . and provide the users with score rankings and other data.

The application servers 4A, 4B, 4C, . . . provide various types of applications (for sharing photos and video, for example) such as game A, game B, game C, . . . and may have a function for exchanging communications between users in addition to the individual services provided by the applications. Users can use such a communication function to acquire points that can be exchanged in the game by making friendship relation with users who play the same game (an example application) to communicate with them by greetings and comments. The more friends you have, the more easily you proceed in a game because you can obtain support from your friends in a battle in the game. Friendship relation is made, for example, when an offer-source user asks friendship and the offer-destination user approves it.

In addition, in the application system 100, a user playing a game can invite another user to the game. When a user of game A uses game B, for example, the user can invite, to game A, a user with whom the user has a friendship relation in game B.

The management server 3 can communicate with the application servers 4A, 4B, 4C, . . . . The user terminal apparatuses 2 can perform communication through the communication network NET, and are, for example, personal computers or portable telephones. The application system 100 can provide the users with a community function between the users and a game, or can sell services and products to the users.

To make an invitation, it is necessary first to associate the account in application A (game A) and the account in application B (game B) of a user who makes the invitation. Second, it is necessary to specify a user who has a friendship relation in application B (game B) with the user who makes the invitation. Since this processing needs to be performed over the different applications, neither the application server 4A nor the application server 4B can execute the processing individually.

The management server 3 executes associating processing for associating the account in application A (game A) and the account in application B (game B) of the user who makes the invitation, and inviting processing for providing the user who makes the invitation with at least one candidate user who receives the invitation (a user to be invited).

Here it is assumed that application A (game A) used by the user who makes the invitation is called an application making an invitation (inviting application), and application B (game B) used by the user to be invited is called an application receiving an invitation (invited application). The invited application is used not only by the user to be invited but also by the user who makes the invitation. The user who makes the invitation and the user to be invited have a friendship relation in the invited application.

1.1 Outline of Associating Processing

An outline of the associating processing will be described with reference to FIG. 2. When a user plays games for the first time, the application servers 4A and 4B generate local identification information (hereafter called LocalID) and register accounts. At a desired timing after the LocalIDs are generated, the application servers 4A and 4B send friend network identification information (hereafter called FNWID) issue requests to the management server 3 to request the issue of FNWIDs.

The FNWIDs are identification information for identifying the users in the entire application system 100 and are managed collectively by the management server 3. In response to FNWID issue requests sent from the application servers 4A and 4B, the management server 3 issues FNWIDs. Therefore, different FNWIDs are issued even if the user of game A and the user of game B are the same user. The management server 3 manages FNWIDs and type information AppIDs indicating the types of games (examples of applications) in association with each other to be able to recognize which game corresponds to a user's FNWID. On the other hand, the LocalIDs are identification information for identifying the users uniquely in the application servers 4A and 4B. In other words, for each of a plurality of mutually different target applications to be managed, the management server 3 issues and manages identification information that uniquely identifies a user who uses the application.

The application server 4A manages, in association with each other, the FNWID (first identification information) and the LocalID that uniquely identifies each of a plurality of users who use game A (first application), and the application server 4B manages, in association with each other, the FNWID (second identification information) and the LocalID that uniquely identifies each of a plurality of users who use game B (second application).

Figure 2:
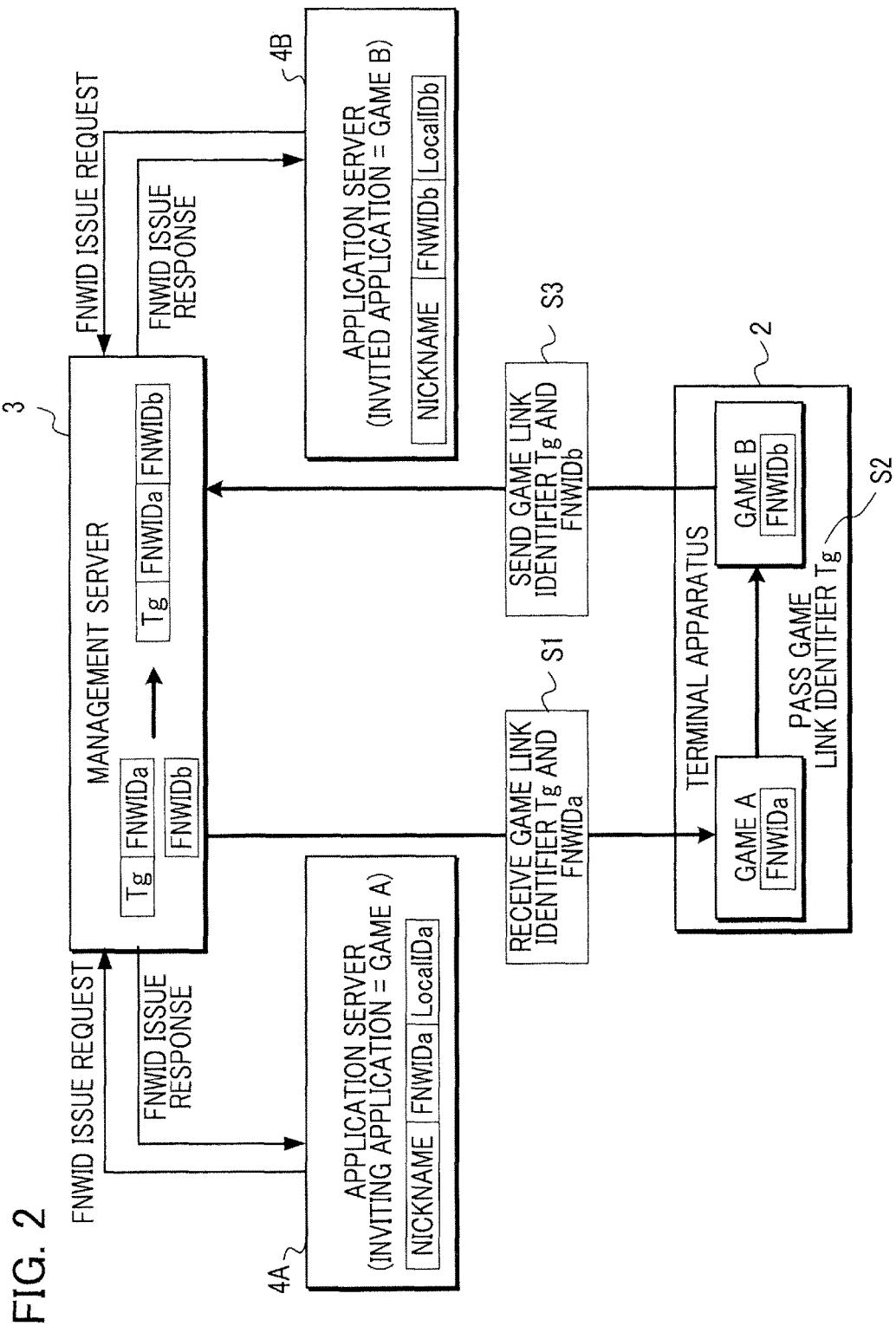
FIG. 2 is a view showing an outline of processing for associating accounts.

In the example shown in FIG. 2, it is assumed that the FNWID issued by the management server 3 in response to the FNWID issue request sent from the application server 4A for the user who plays game A is called FNWIDa, the LocalID corresponding to FNWIDa is called LocalIDa, the FNWID issued by the management server 3 in response to the FNWID issue request sent from the application server 4B, corresponding to game B, for the same user who plays game A is called FNWIDb, the LocalID corresponding to FNWIDb is called LocalIDb, the type information corresponding to game A is called AppIDa, and the type information corresponding to game B is called AppIDb. FNWIDa is stored in the management server 3, the application server 4A, and the terminal apparatus 2. In the same manner, FNWIDb is stored in the management server 3, the application server 4B, and the terminal apparatus 2. LocalIDa is stored in the application server 4A, and LocalIDb is stored in the application server 4B. When FNWIDa and FNWIDb are issued, the management server 3 cannot yet recognize that they are identification information issued to the same user.

In the associating processing for associating FNWIDa with FNWIDb, the management server 3 issues a game link identifier Tg (an example application link identifier) corresponding to FNWIDa and sends the game link identifier Tg to the terminal apparatus 2 corresponding to FNWIDa (S1).

Then, in the terminal apparatus 2, game A corresponding to FNWIDa passes the game link identifier Tg to game B corresponding to FNWIDb (S2). The program of game B sends the passed game link identifier Tg and FNWIDb to the management server 3 (S3). In the process for passing the game link identifier Tg from game A to game B (S2), a predetermined area (application share area) in a storage device 23 (see FIG. 8) of the terminal apparatus 2 may be involved.

In this manner, the game link identifier Tg issued by the management server 3 in association with FNWIDa is transferred from game A in the terminal apparatus 2 to the management server 3 through game B in the terminal apparatus 2 and is received in association with FNWIDb. The management server 3 searches game link identifiers already issued. When the received game link identifier matches an issued game link identifier, the management server 3 associates FNWID corresponding to the received game link identifier with FNWID corresponding to the issued game link identifier. In this example, the received game link identifier is Tg, and the FNWID corresponding thereto is FNWIDb. In the management server 3, the issued game link identifier Tg corresponds to FNWIDa. Therefore, the management server 3 can associate FNWIDa with FNWIDb. By doing so, the account for the inviting application (game A) and the account for the invited application (game B) of the user who makes the invitation are associated with each other.

In the process in which the game link identifier Tg is issued for FNWIDa used in the terminal apparatus 2 and the game link identifier Tg is transferred from the terminal apparatus 2 to the management server 3, the application servers 4A and 4B may be involved. More specifically, the game link identifier Tg issued by the management server 3 may be transferred from the application server 4A to the management server 3, through game A in the terminal apparatus 2, game B in the terminal apparatus 2, and to the application server 4B.

The above-described associating processing is executed when the user of the terminal apparatus 2 invites to the inviting game A another user with whom the user has a friendship relation in the invited game B. In the following description, the user who invites another user to game A, which is the inviting application, is called an inviting user, and a user who uses game B, which is an invited application, and who is to be invited to game A is called a user to be invited.

Figure 1B:
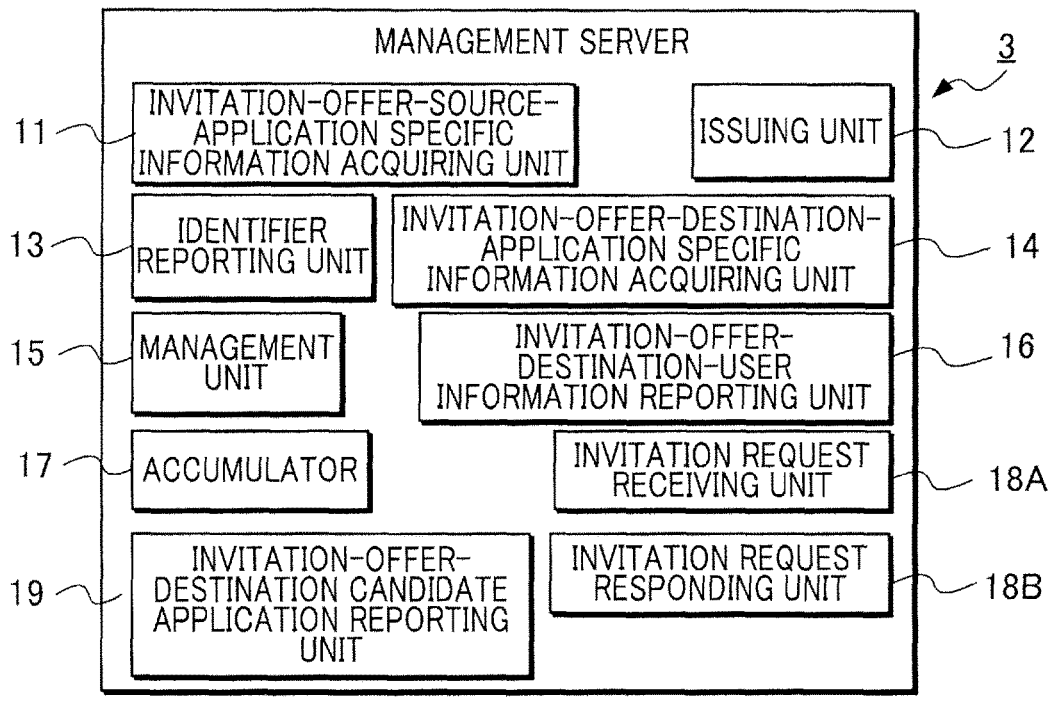
FIG. 1B is a block diagram showing a functional configuration of a management server.

To perform the associating processing, the management server 3 shown in FIG. 1B includes an invitation-offer-source-application specific information acquiring unit 11 for acquiring, from game A (example inviting application) the inviting user uses at the terminal apparatus 2, invitation-offer-source-application specific information that includes the type information AppIDa specifying game A and $FNWID\_A^x$ of the inviting user, corresponding to game A. The management server 3 also includes an issuing unit 12 for issuing the game link identifier Tg (an example application link identifier) associated with the invitation-offer-source-application specific information. The management server 3 also includes an identifier reporting unit 13 for reporting the game link identifier Tg issued by the issuing unit 12 to game A used by the inviting user. The management server 3 also includes an invitation-offer-destination-application specific information acquiring unit 14 for acquiring, from game B in the terminal apparatus 2 of the inviting user, invitation-offer-destination-application specific information that includes the game link identifier Tg passed from game A, which makes an invitation, to game B (an example invited application), which receives the invitation, in the terminal apparatus 2 of the inviting user, the type information AppIDb specifying game B, which receives the invitation, and $FNWID\_B^x$ of the inviting user, corresponding to game B, which receives the invitation. The management server 3 also includes a management unit 15 for managing, in association with each other, $FNWID\_A^x$ of game A, which makes the invitation, and $FNWID\_B^x$ of game B, which receives the invitation, for which the game link identifier issued by the issuing unit 12 and the game link identifier acquired by the invitation-offer-destination-application specific information acquiring unit 14 match.

The invitation-offer-source-application specific information acquiring unit 11 may directly acquire the invitation-offer-source-application specific information from the terminal apparatus 2, or may indirectly acquire the information from the terminal apparatus 2 through the application server 4A. In the same manner, the invitation-offer-destination-application specific information acquiring unit 14 may directly acquire the invitation-offer-destination-application specific information from the terminal apparatus 2, or may indirectly acquire the information from the terminal apparatus 2 through the application server 4B. In the same manner, the identifier reporting unit 13 may directly report the game link identifier Tg issued by the issuing unit 12 to game A, which the inviting user uses, in the terminal apparatus 2, or may indirectly report the identifier to the terminal apparatus 2 through the application server 4A.

The above-described associating processing can be considered as a control method for the management server 3, for controlling the management server 3 such that the invitation-offer-source-application specific information that includes the type information AppIDa specifying game A and FNWID_$A^x$ of the inviting user, corresponding to game A is acquired from game A in the terminal apparatus 2 which the inviting user uses; the game link identifier Tg associated with the invitation-offer-source-application specific information is issued; the issued game link identifier Tg is reported to game A, which the inviting user uses; the invitation-offer-destination-application specific information that includes the game link identifier Tg passed from game A to game B, the type information AppIDb specifying game B, and FNWID_$B^x$ of the inviting user, corresponding to game B is acquired from the terminal apparatus 2 of the inviting user; and FNWID_$A^x$ of the inviting user, corresponding to game A, and FNWID_$B^x$ of the inviting user, corresponding to game B, for which the issued game link identifier Tg and the acquired game link identifier Tg match, are managed in association with each other.

The above-described associating processing can be considered as an identification-information associating method in the management server 3, in which the invitation-offer-source-application specific information (example first information) that includes the type information AppIDa specifying game A (example first application) and FNWID_$A^x$ (example user identification information) of the inviting user (example first user), corresponding to game A is acquired from game A in the terminal apparatus 2 which the inviting user uses; the game link identifier Tg associated with the invitation-offer-source-application specific information is issued; the issued game link identifier Tg is reported to game A, which the inviting user uses; the invitation-offer-destination-application specific information (example second information) that includes the game link identifier Tg passed from game A to game B (example second application), the type information AppIDb specifying game B, and FNWID_$B^x$ of the inviting user, corresponding to game B is acquired from game B; and FNWID_$A^x$ of the inviting user, corresponding to game A, and FNWID_$B^x$ of the inviting user, corresponding to game B, for which the issued game link identifier Tg and the acquired game link identifier Tg match, are managed in association with each other.

So long as it can be checked whether the game link identifier Tg issued by the issuing unit 12 and the game link identifier Tg received by the invitation-offer-destination-application specific information acquiring unit 14 match, any generation method can be used, and the identifier can have any contents. For example, the identifier may be a unique character string (token) in which alphanumeric characters are combined. The token is passed from game A to game B in the terminal apparatus 2 of the inviting user. Any method can be used to pass the token from game A to game B. The trigger for passing the token may be based on an operation of the user, an automatic process in game A, or a program process executed in the terminal apparatus, activated by game A. In the present embodiment, as described later, the trigger for passing the token takes place when a special activation of game B from game A different from usual activation occurs.

Figure 1C:
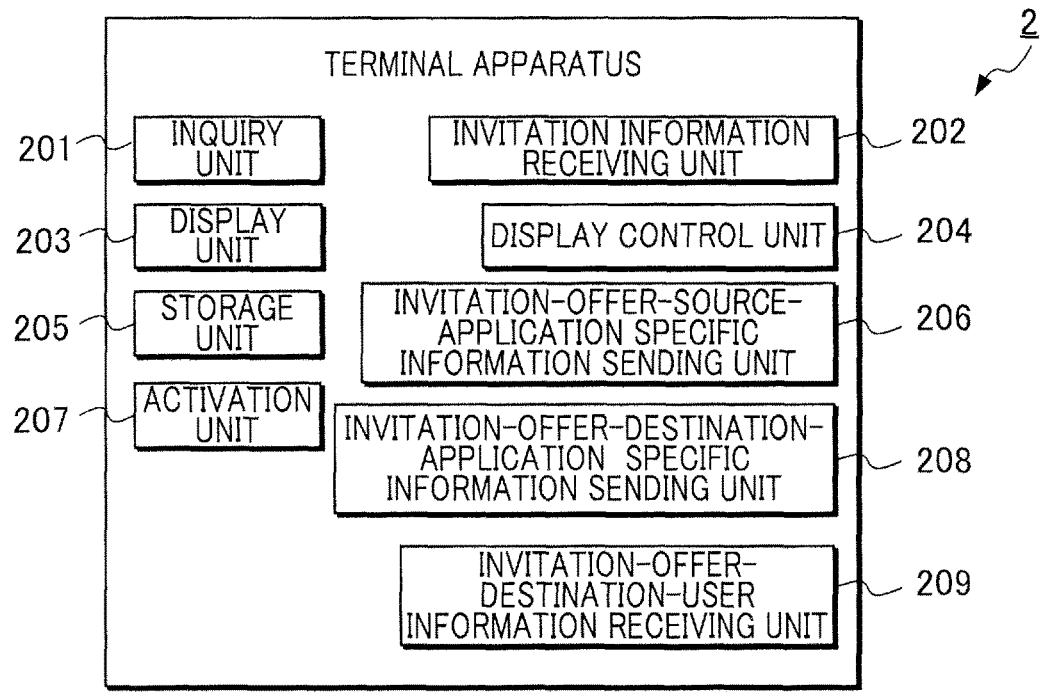
FIG. 1C is a block diagram showing a functional configuration of a terminal apparatus.

On the other hand, the terminal apparatus 2 shown in FIG. 1C includes a storage unit 205 for storing an FNWID (example user identification information) for each available game (an example application); an invitation-offer-source-application specific information sending unit 206 for sending to the management server 3 the invitation-offer-source-application specific information generated by game A (an example inviting application) which the inviting user uses; an activation unit 207 for acquiring the game link identifier Tg reported from the management server 3 and for activating game B (an example invited application) so as to pass the game link identifier Tg from game A, which make an invitation, to game B, which receives the invitation; and an invitation-offer-destination-application specific information sending unit 208 for sending to the management server 3 invitation-offer-destination game information that includes the game link identifier Tg acquired from game A, which make the invitation.

For example, the storage unit 205 of the terminal apparatus 2 stores FNWIDa corresponding to game A and FNWIDb corresponding to game B. When game B, which receives the invitation, is selected during game A in the terminal apparatus 2, the activation unit 207 acquires the game link identifier Tg corresponding to FNWIDa, which identifies the inviting user in game A being used, and issued by the issuing unit 12 of the management server 3, then activates game B, and passes the game link identifier Tg to game B, which receives the invitation. The invitation-offer-destination-application specific information sending unit 208 sends to the management server 3 the invitation-offer-destination-application specific information that includes the game link identifier Tg acquired from game A, which makes the invitation, and FNWIDb corresponding to game B.

By doing so, even if a new account to be managed by the user is not set up in the management server 3, the management server 3 can manage, in association with each other, the account for the application server 4A and the account for the application server 4B, which are operated individually, with the FNWIDs by passing around the game link identifier. In other words, it is not necessary for the user to be conscious of the management server 3. In this manner, it is possible to associate the accounts of the same user for different games. As described above, the associating processing is executed when the invited game is selected in the terminal apparatus 2. Supposedly, if the associating processing is executed as required for all users irrespective of the selection of the invited game, the processing load of the management server 3 would increase. When the associating processing is executed upon selection of the invited game, as in the present embodiment, since the associating processing is executed when an invitation is made, efficient association can be made and the processing load of the management server 3 decreases. The associating processing may be executed, not after the selection of the invited game, but before the selection of the invited game. In other words, the associating processing may be executed when the user requests the processing, which associates a plurality of FNWIDs. However, because the associating processing is executed at a timing at which a predetermined process occurs, as described above, the processing load of the management server 3 decreases in comparison with a case in which, when the same user has a plurality of FNWIDs, the associating processing is executed for all pairs of the FNWIDs.

With respect to the inviting processing, the management server 3 includes an invitation-offer-destination-user information reporting unit 16 for managing friendship relations (example specific relationships) between users in each of the plurality of games on the basis of FNWIDs (example user identification information) and for reporting to game B, which receives the invitation, the user information (for example, a user link identifier or a nickname) of a user who has a friendship relation with the inviting user in game B and is a candidate user to be invited, game B receiving the invitation. On the other hand, the terminal apparatus 2 includes an invitation-offer-destination-user information receiving section 209 for receiving the user information of the user who is a candidate user to be invited, reported from the management server 3. By doing so, the inviting user can recognize, in game B, which the inviting user uses, a candidate user to be invited to the inviting game A and can invite a friend in another game to the game which the inviting user is currently using.

The invited game B, to which the user information is reported, is a game available in the terminal apparatus 2 of the inviting user. This report is sent directly from the management server 3 to the terminal apparatus 2, or is sent from the management server 3 to the terminal apparatus 2 through the application server 4B.

The management server 3 manages the friendship relations between the users, for example, in a friendship relation table TBL12 (described later) stored on its hard disk 33 (described later). The friendship relations may be managed in any other apparatus in the application system 100 or any other apparatus that can communicate with the application system 100.

The management unit 15 of the management server 3 receives an invitation request indicating an invitation to the inviting game A for a user to be invited selected by the inviting user from among the candidate users to be invited, indicated by the user information reported by the invitation-offer-destination-user information reporting unit 16, stores invitation information indicating that the inviting user invites the user to be invited to the inviting game A in an accumulator 17, and manages the information. By doing so, the management server 3 can collectively manage information indicating who invites whom to which game (an example application).

The invitation-offer-destination-user information reporting unit 16 of the management server 3 issues a user link identifier Tu for each user who is a candidate user to be invited, and reports user information that includes the user link identifier Tu to game B (an example invited application), which receives an invitation. The management unit 15 stores invitation information in the accumulator 17 and manages the information on the basis of the user link identifier Tu included in an invitation request. In this case, the user who is a candidate user to be invited is managed using the user link identifier Tu.

The management server 3 also includes an invitation request receiving unit 18A for acquiring invitation inquiry information that includes the type information AppID that specifies a game and the FNWID of the user, corresponding to the game in response to an inquiry request sent from one of the plurality of games, and an invitation request responding unit 18B for reporting, when invitation information that matches the invitation inquiry information is found in the invitation information accumulated in the accumulator 17, an inquiry result indicating the details of invitation on the basis of the invitation information to the game that has made the inquiry request as a result of the inquiry request. Therefore, when a game executed in the terminal apparatus 2 makes an invitation inquiry, corresponding invitation information can be extracted from the information accumulated in the accumulator 17 and can be reported to the terminal apparatus 2. Consequently, the user of the terminal apparatus 2 can recognize the invitation from another user. An inquiry request sent from one of the plurality of games A, B, and C may be directly sent from the terminal apparatus 2, or may be indirectly sent through the corresponding one of the application servers 4A, 4B, 4C, . . . . The same applies to reporting the result of the inquiry request.

When no invitation information exists, the invitation request responding unit 18B does not need to send an invitation response to the terminal apparatus 2, but may report, to the terminal apparatus 2, an inquiry result indicating whether invitation information that matches the invitation inquiry information exists in the invitation information accumulated in the accumulator 17, as a result of the inquiry request.

The management server 3 also includes an invitation-offer-destination candidate application reporting unit 19 for reporting, to the inviting game, at least one candidate game (a candidate application) serving as a candidate of a game in the invitation-offer destination in response to the request sent from the inviting game of the inviting user. The inviting user operates the terminal apparatus 2 to select a game to be invited from among the at least one candidate games reported by the invitation-offer-destination candidate application reporting unit 19. In this case, the invitation-offer-destination candidate application reporting unit 19 may report the at least one game belonging to the application system 100 except the inviting game as candidate games, or may report, as candidate games, the at least one game that belongs to the application system 100 except the inviting game and that are used by the inviting user. A request sent from the inviting game may be directly sent from the terminal apparatus 2, or may be indirectly sent through the corresponding one of the application servers 4A, 4B, 4C, . . . . The same applies to the reporting of candidate games.

A game (an example application) can have, for example, a not-running state, an active state in which some process is being executed, a background state in which nothing is displayed on the screen but some process is being executed, or a suspended state in which no processes are executed and the game is suspended. Activation of a game means that the game transits from the not-running state, or the suspended state to the active state. The end of a game means that the game transits from the active state to the not-running state, or the suspended state. When a plurality of games can be simultaneously in the active states, activation of a game means that the game transits to a state in which the user can operate the game, such as a state in which the game is displayed in the foreground on the screen. A LocalID is generated in the game at any timing, such as when the game is first activated or when a tutorial finishes.

Installing a game includes not only new introduction of the game program not yet introduced into the terminal apparatus 2 but also an update of the game program to be compatible with the application system 100. In other words, installing a game includes downloading an update program to be compatible with the application system 100 for the game installed in the terminal apparatus 2 to update the program therefor.

1.2 Structure of Management Server 3

Figures 3, 4:
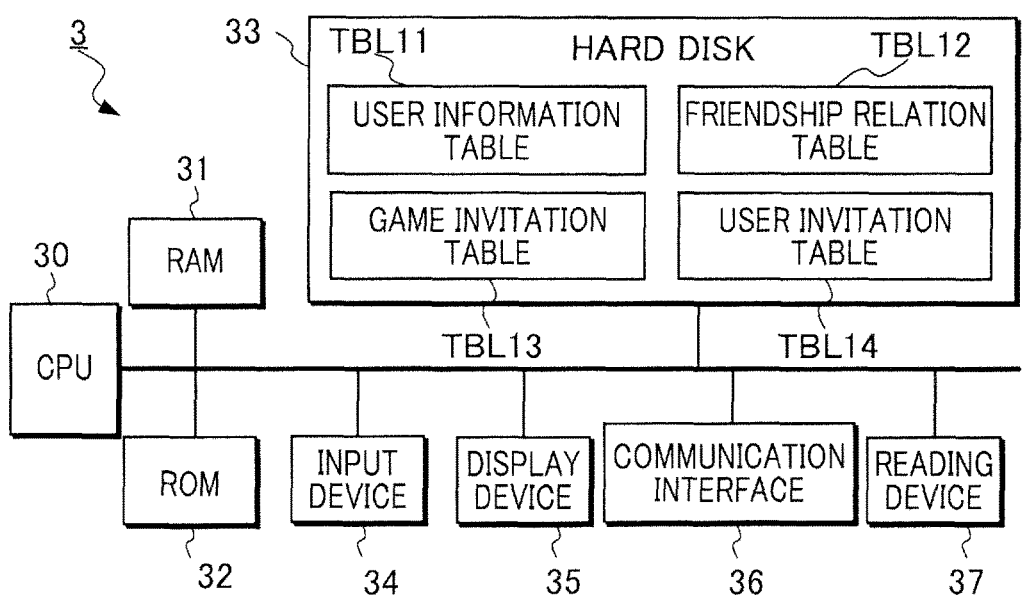
FIG. 3 is a block diagram showing a structure of the management server.
FIG. 4 is a view showing an example data structure of a user information table.

FIG. 3 shows a structure of the management server 3. As shown in the figure, the management server 3 includes a central processing unit (CPU) 30 for controlling the entire server, a random access memory (RAM) 31 that functions as a work area for the CPU 30, a read only memory (ROM) 32 having stored therein a boot program and others, a hard disk 33 for storing various types of programs and data, an input device 34 that includes a keyboard and a mouse, a display device 35 for displaying an image, a communication interface 36 for communicating with an external device through the communication network NET, and a reading device 37 for reading data from an information recording medium such as a compact disc.

The hard disk 33 includes, for example, a user information table TBL11 for storing information related to users, a friendship relation table TBL12 for storing information related to friendship relations, a game invitation table TBL13 for storing information related to inviting users, and a user invitation table TBL14 for storing the association between an inviting user and a user to be invited. The user invitation table TBL14 functions as the accumulator 17. The CPU 30 functions as the invitation-offer-source-application specific information acquiring unit 11, the issuing unit 12, the identifier reporting unit 13, the invitation-offer-destination-application specific information acquiring unit 14, the management unit 15, the invitation-offer-destination-user information reporting unit 16, the invitation request receiving unit 18A, the invitation request responding unit 18B, and the invitation-offer-destination candidate application reporting unit 19.

FIG. 4 shows a data structure of the user information table TBL11. The user information table TBL11 stores a plurality of records. Each record includes a record identification information ID that uniquely identifies the record, type information AppID (hereafter called just AppID) indicating the type of a game, a user nickname, and the FNWID. By referencing the user information table TBL11, the relationship among the FNWID and the nickname of a user, and the type of the game can be found. As shown in FIG. 1A, the application servers 4A, 4B, 4C, . . . include the user information tables TBL11A, TBL11B, TBL11C, . . . each having the above-described data structure.

FIG. 5 shows a data structure of the friendship relation table TBL12. The friendship relation table TBL12 has stored therein a plurality of records. Each record includes a record identification information ID, an AppID, group information Group indicating the type of relationship between users, friendship-offer-source local identification information LocalID_From (hereafter called just LocalID_From) of the friendship-offer-source user, friendship-offer-destination local identification information LocalID_To (hereafter called just LocalID_To) of the friendship-offer-destination user, friendship-offer-source friend network identification information FNWID_From (hereafter called just FNWID_From) of the friendship-offer-source user, friendship-offer-destination friend network identification information FNWID_To (hereafter called just FNWID_To) of the friendship-offer-destination user, and state information St indicating the state of the friendship offer.

It is advantageous in reducing the storage capacity when a friendship relation is recorded so as to include the friendship-offer source and the friendship-offer destination separately. Supposedly, if the LocalID of a user and the LocalIDs of all users with whom the user has friendship relations are stored in association with each other, twice the storage capacity would be required. For example, it is assumed that user A is a friendship offer source and user B is a friendship offer destination. When the LocalIDs of users who have friendship relations with each user are stored for the user, it is necessary to store a friendship relation with user B for user A and also to store a friendship relation with user A for user B. In contrast, in the present embodiment, since the LocalID of the friendship offer destination and the LocalID of the friendship offer source are associated and stored in one record, the required storage capacity is halved. Even when the state information St is updated, the required processing is halved.

The relationship between a user and another user can be a friendship relation, a competitor relationship, and a blocked relationship. A friendship relation is established when a friendship offer from a user is sent to another user and the other user approves the offer. A competitor relationship is established when a user performs a blocking offer for another user whom the user considers to be a competitor, and the approval of the other user is not necessary. This is used, for example, when a user and another user play the same game and the user wants to register the other user as a competitor. A blocked relationship is established when a user performs a blocking offer for another user whom the user wants to block, in the same way as the competitor relationship, and the approval of the other user is not necessary. This is used when friendship offers are repeatedly received from the other user despite prior refusal, or when the other user troubles the user for some reason, such as an opinion in a bulletin board.

The group information Group specifies "Friends" for a record having a friendship relation, "Rival" for a record having a competitor relationship, and "Block" for a record having a blocked relationship. The state information St specifies "0" while a friendship offer is pending, "1" after approval, and "2" after refusal. Since the competitor relationship and the blocked relationship are established just by blocking offers, the state information St is set to "null" because it is not necessary to record the state information. The state information St may be always set to "0" for the competitor relationship and the blocked relationship.

For example, the record having ID=1 indicates that, in the game having an AppID of Ser. No. 00000001, the user having a LocalID of Ser. No. 00000011 has made a friendship offer for the user having a LocalID of Ser. No. 00003120 and the offer has been approved. The record having ID=1 is generated at a timing at which the user having a LocalID of Ser. No. 00000011 makes a friendship offer, and the state information St is set to "0". The state information St is updated to "1" (approval) or "2" (refusal) when the user having a LocalID of Ser. No. 00003120 receives the friendship offer and approves or refuses it.

When AppID of a specific game is referred to in the friendship relation table TBL12, the friendship relations between the users in that specific game can be recognized. A user with whom a friendship relation has already been made or a friend to whom a friendship offer has been made can be recognized by referring to the state information St.

If a friendship relation is canceled after the friendship relation was established, that record is deleted. The table may be configured such that a new item indicating whether a record is valid or invalid is added and a record in which the friendship relation is canceled is made invalid, without deleting the record. If a friendship relation is established again with a user with whom a friendship relation was canceled, a new record may be generated or the item indicating whether a record is valid or invalid may be updated from "invalid" to "valid".

As shown in FIG. 1A, the application servers 4A, 4B, 4C, . . . include the friendship relation tables TBL12A, TBL12B, TBL12C, . . . . Each of the friendship relation tables TBL12A, TBL12B, TBL12C, . . . stores friendship relations for each game, and each record includes the record identification information ID, the group information Group, the LocalID_From, the LocalID_To, the FNWID_From, the FNWID_To, and the state information St indicating the state of the friendship offer. When a friendship relation is changed in any of the application servers 4A, 4B, 4C, . . . and the stored content in the corresponding friendship relation table TBL12A, TBL12B, TBL12C, . . . is changed, a change notice is sent from the application server 4A, 4B, 4C, . . . to the management server 3, and the change in the friendship relation is reflected in the friendship relation table TBL12, thus synchronizing the stored contents.

FIG. 6 shows a data structure of the game invitation table TBL13 in the management server 3. The game invitation table TBL13 stores a plurality of records. Each record stores, in association with each other, a record identification information ID, a game link identifier Tg, inviting-game type information AppID_From indicating the game type of the inviting game (hereafter just called AppID_From), invited-game type information AppID_To indicating the game type of the invited game (hereafter just called AppID_To), friend network identification information InviteFNWID_From of the inviting user, corresponding to the inviting game (hereafter just called InviteFNWID_From), and friend network identification information InviteFNWID_To of the inviting user, corresponding to the invited game (hereafter just called InviteFNWID_To).

As described above, the association of FNWIDs of the same user in different games is performed by using the game link identifier Tg when another user is invited to a game. For example, when it is assumed that the AppID of game A is 00000001 and the AppID of game B is 00000002, what is understood from the record having a record identification information ID of "3" shown in FIG. 6 are follows. The inviting user tries to invite another user who plays game B to game A, and the FNWID of the inviting user, corresponding to game A, which is QWE75891, is associated with the FNWID of the inviting user, corresponding to game B, which is SCF55663. In the records having record identification IDs of "4" and "5", InviteFNWID_To is set to "NULL". This means that the game link identifier Tg has been issued, but the management server 3 has not received the game link identifier Tg and FNWID_B$^x$ of the inviting user, corresponding to the invited game B, from the terminal apparatus 2 of the inviting user.

FIG. 7 shows a data structure of the user invitation table TBL14. The user invitation table TBL14 stores a plurality of records. Each record stores, in association with each other, a record identification information ID, a user link identifier Tu, AppID_From, AppID_To, InviteFNWID_From, InviteFNWID_To, a nickname Name From of the inviting user, corresponding to the invited game (hereafter just called Name From), a nickname Name_To of the user to be invited, corresponding to the invited game (hereafter just called Name_To), state information St indicating the state of the invitation offer, and date information Date indicating the invitation date. The state information St indicates "not yet offered" by "0", "offer pending" by "1", "approved" by "2", "refused" by "3", "membership registration completed" by "4", and "tutorial completed" by "5".

By referring to the user invitation table TBL14, it can be found who invited whom to which game and, furthermore, whether invitation was approved or refused.

1.3 Structure of Terminal Apparatus 2

Figure 8:
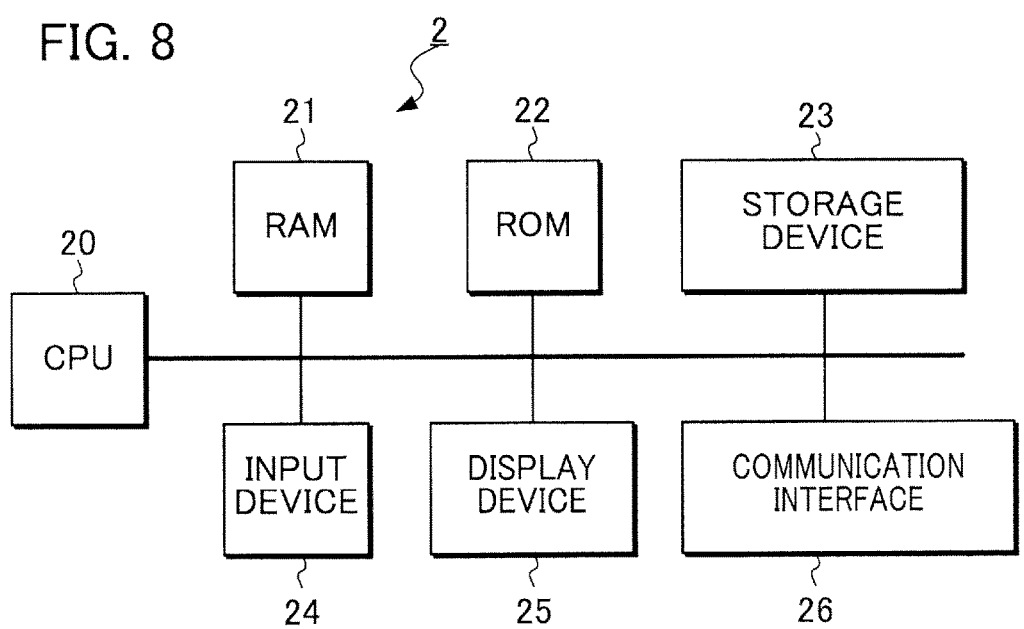
FIG. 8 is a block diagram showing a structure of the terminal apparatus.

FIG. 8 shows the structure of the terminal apparatus 2. The terminal apparatus 2 includes a CPU 20 for controlling the entire apparatus, a RAM 21 that functions as a work area for the CPU 20, a ROM 22 having stored therein a boot program and others, a storage device 23 for storing various types of programs and data, an input device 24 that includes a ten-key pad and touch sensitive keys, a display device 25 for displaying an image, and a communication interface 26 for communicating with an external device through the communication network NET. The storage device 23 stores various types of applications, such as games, FNWIDs corresponding to each application available in the terminal apparatus 2, and a control program for controlling the entire apparatus.

The storage device 23 corresponds to the storage unit 205 shown in FIG. 1C, and the display device 25 corresponds to a display unit 203. When the CPU 20 executes the control program, the CPU 20 functions as a display control unit 204, an inquiry unit 201, an invitation information receiving unit 202, the invitation-offer-source-application specific information sending unit 206, the activation unit 207, the invitation-offer-destination-application specific information sending unit 208, and the invitation-offer-destination user information receiving unit 209.

When an application installed in the terminal apparatus 2 is compatible with in the application system 100, a software development kit (SDK) may be incorporated in the program of that application. The SDK is formed of a collection of application programming interfaces (APIs) that mediate between the application installed in the terminal apparatus 2 and the management server 3. In other words, the SDK can be recognized as a program incorporated into the control program of game A or game B installed in the terminal apparatus having the CPU 20 (computer) and the display device 25 (example display unit).

If an application installed in the terminal apparatus 2 is a version that is not compatible with the application system 100, when a version that includes an SDK can be downloaded, the version of the application installed in the terminal apparatus 2 is updated, allowing the application to be compatible with the application system 100. In other words, the application program is configured so as to be able to incorporate an SDK.

An SDK is provided, for example, by the business entity that manages the management server 3. In that case, the service providing entities of the application servers 4A, 4B, 4C, . . . incorporate the SDK program provided by the business entity that manages the management server 3 into the application programs of game A, game B, game C, . . . and provide the application programs to the users of the terminal apparatuses 2.

2. Operation of Application System

The operation of the application system 100 will be described in terms of processing at the inviting user side and processing at the side of the user to be invited.

2.1 Processing at the Inviting User Side

Figure 9B:
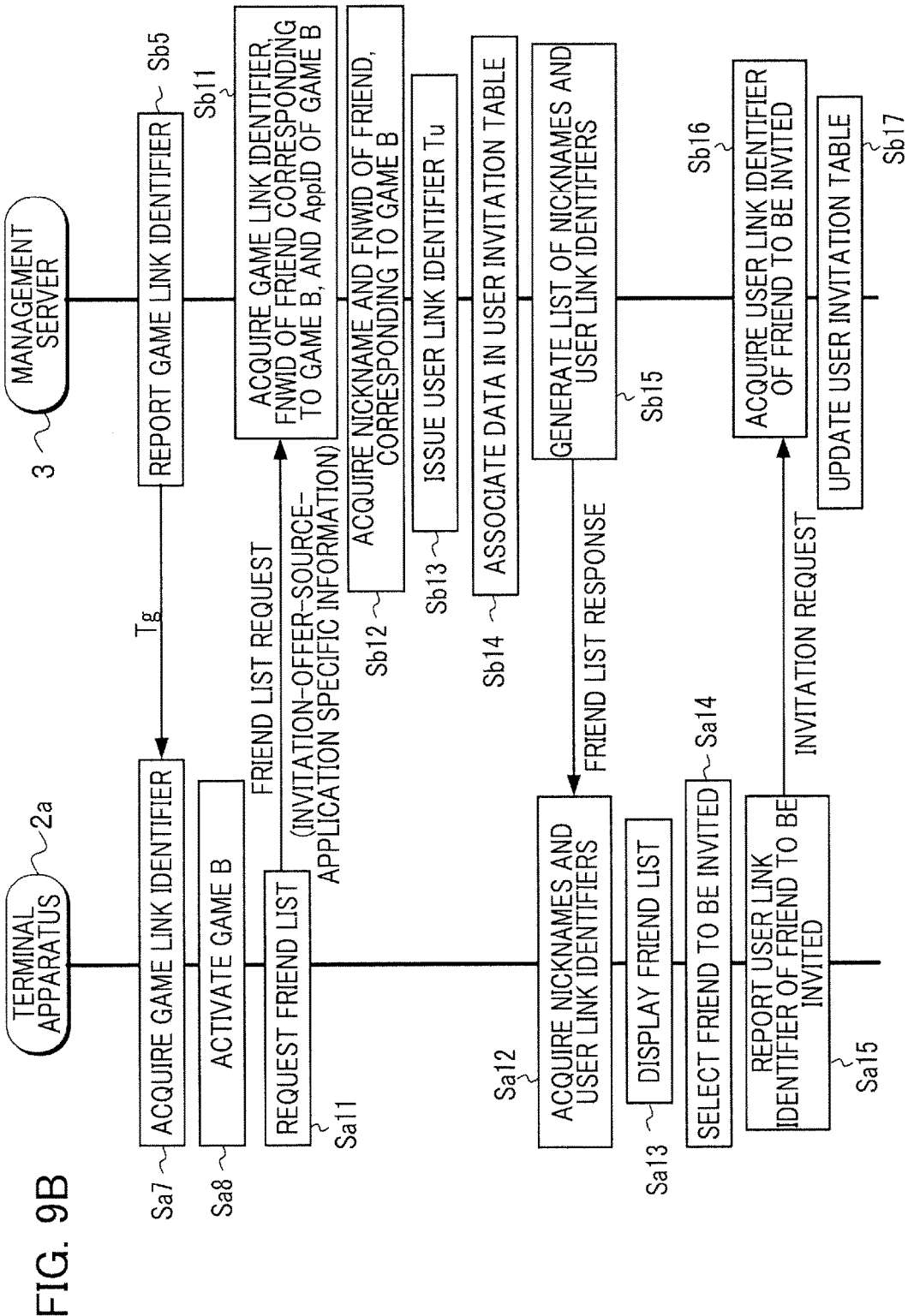
FIG. 9B is a sequence chart showing details of the processing at the inviting user side.

FIGS. 9A and 9B show details of the processing at the inviting user side. In this example, it is assumed that the terminal apparatus of the inviting user has a symbol "2a" and the inviting user X invites a friend Y in game B to game A. In that case, the inviting application is game A and the invited application is game B. In the following description, the CPU 30 executes processing in the management server 3, and the CPU 20 executes processing in the terminal apparatus 2a.

As shown in FIG. 9A, when the inviting user first operates the terminal 2a in game A to display a game friend invitation screen (Sa1), the terminal apparatus 2a sends a list request for requesting a list of games in which an invitation is allowed, to the management server 3 (Sa2). The list request includes the type information AppIDa of game A. Here, games in which an invitation is allowed mean a plurality of games (example target applications) to be managed by the management server 3. The management server 3 may be set such that an invitation from a certain game among the plurality of games to be managed can be inhibited, so that the game from which an invitation is inhibited is excluded from the list of games in which an invitation is allowed.

When the management server 3 receives the list request and acquires AppIDa, the management server 3 generates a list of games in which an invitation is allowed (Sb1). More specifically, the management server 3 generates sets of an AppID and game information indicating the game name and game details, as a game list, for game B, game C, . . . excluding game A specified by the type information AppIDa included in the list request, among game A, game B, game C, . . . belonging to the application system 100. Then, the management server 3 sends a list response that includes the game list to the terminal apparatus 2a. In other words, the CPU 30 functions as the invitation-offer-destination candidate application reporting unit 19, which receives the list request from the terminal apparatus 2a of the inviting user and reports a candidate application that is a candidate for the invited application.

Figure 10:
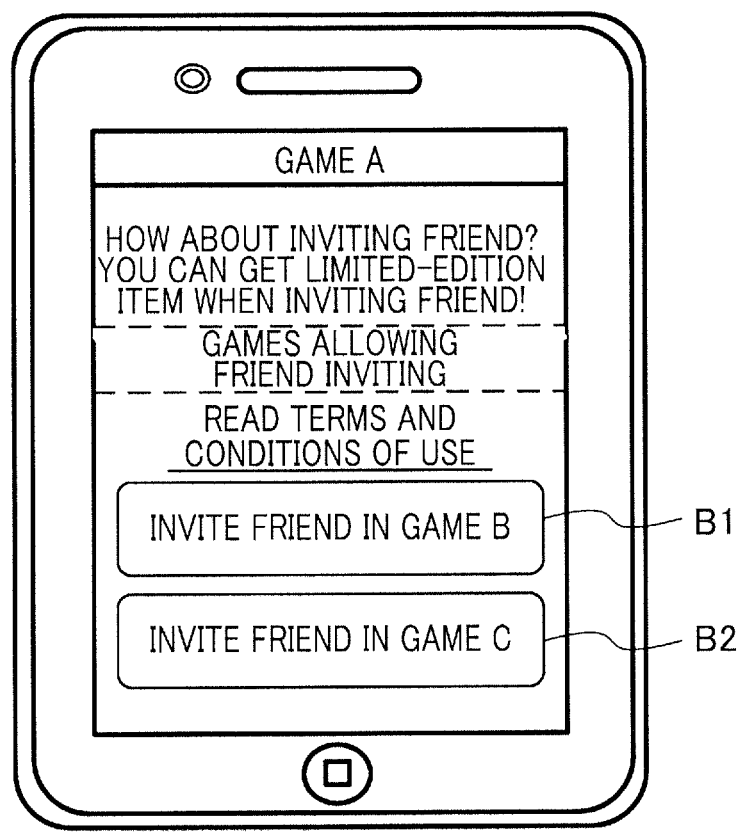
FIG. 10 is a view showing an example game list screen.

When the terminal apparatus 2a receives the list response, the terminal apparatus 2a acquires the game list included in the list response (Sa3). Then, the terminal apparatus 2a displays games in which an invitation is allowed, on the display device 25 on the basis of the acquired game list (Sa4). For example, a game list screen is displayed on the display device 25 as shown in FIG. 10. A button B1 and a button B2 are displayed in the game list screen. When the inviting user clicks on the button B1, game B is selected as a game to be invited. When the inviting user clicks on the button B2, game C is selected as a game to be invited (Sa5). It may be configured so that, when games in which an invitation is allowed are displayed on the display device 25, games installed in the terminal apparatus 2a are identified in the acquired game list, and only the games installed are displayed on the display device 25.

Next, when the game to be invited is selected, the terminal apparatus 2a sends invitation-offer-source-application specific information that includes the type information AppIDa, which indicates the game type of the inviting game, the type information AppIDb, which indicates the game type of the game to be invited, and the friend network identification information FNWID_$A^x$ of the inviting user X, corresponding to the inviting game, to the management server 3 (Sa6). In other words, the CPU 20 functions as the invitation-offer-source-application specific information sending unit 206, which sends the invitation-offer-source-application specific information generated by game A, which is the inviting application used by the inviting user, to the management server 3. In this example, it is assumed that the inviting user clicks on the button B1 to select game B.

When the management server 3 receives the invitation-offer-source-application specific information, the management server 3 acquires the type information AppIDa of the inviting game, the type information AppIDb of the game to be invited, and the friend network identification information FNWID_$A^x$ of the inviting user X, corresponding to the inviting game, included in the invitation-offer-source-application specific information (Sb2). The CPU 30 executes the process of Sb2 to function as the invitation-offer-source-application specific information acquiring unit 11.

Then, the management server 3 issues a game link identifier Tg (Sb3) and stores the type information AppIDa of the inviting game, in AppID_From, the type information AppIDb of the game to be invited, in AppID_To, and the friend network identification information FNWID_$A^x$ of the inviting user X, corresponding to the inviting game, in FNWID_From, in association with the game link identifier Tg in the game invitation table TBL13 (Sb4). By doing so, each type of information is associated with the game link identifier Tg. Here, when it is assumed that AppID_From is 00000001, which indicates game A, AppID_To is 00000002, which indicates game B, InviteFNWID_From is XCV56714, and the game link identifier Tg is 56844SAS, the record shown in FIG. 11A is recorded in the game invitation table TBL13. In other words, the CPU 30 of the management server 3 functions as the issuing unit 12, which issues the game link identifier Tg associated with the invitation-offer-source-application specific information.

Then, as shown in FIG. 9B, the management server 3 reports the game link identifier Tg (=56844SAS) to the terminal apparatus 2a (Sb5). The CPU 30 functions as the identifier reporting unit 13, which reports the issued game link identifier Tg to game A, which is the inviting application used in the terminal apparatus 2a of the inviting user.

When the terminal apparatus 2a receives the game link identifier Tg and acquires it (Sa7), the terminal apparatus 2a activates game B in a special mode (Sa8). Here, the type information AppIDb, which specifies game B, may be acquired from the management server 3 together with the game link identifier Tg, and game B may be activated according to the acquired type information AppIDb. Alternatively, the terminal apparatus 2a may store the type information AppIDb of game B selected in Sa5, and activate game B when the terminal apparatus 2a acquires the game link identifier Tg. In this example, the CPU 20 of the terminal apparatus 2a automatically activates the game to be invited (game B), but a screen for prompting the inviting user to activate the game to be invited may be displayed on the display device 25 instead. In other words, in this special mode, activation is made not to play a game but to report the game link identifier Tg and the AppID to the game to be invited.

In the process of activating the game to be invited, the game link identifier Tg managed by the inviting game is passed to the game to be invited. In this example, the game link identifier Tg is passed from game A to game B. In other words, the CPU 20 functions as the activation unit 207, which acquires the game link identifier Tg reported from the management server and activates game B in order to pass the game link identifier Tg from game A, which is the inviting application, to game B, which is the invited application.

Next, the terminal apparatus 2a sends a friend list request for requesting a friend list in the invited game B, to the management server 3 (Sa11). The friend list request includes the invitation-offer-destination-application specific information, which includes the game link identifier Tg (=56844SAS) acquired in Sa7, FNWID_$B^x$ of the inviting user X, corresponding to the invited game B, and the type information AppIDb indicating the type of the invited game. In this example, it is assumed that FNWID_$B^x$=QWE75891 and AppID=00000002. In other words, the CPU 20 functions as the invitation-offer-destination-application specific information sending unit 208, which sends the invitation-offer-destination-application specific information to the management server 3.

When the management server 3 receives the friend list request, the management server 3 acquires the invitation-offer-destination-application specific information included in the friend list request (Sb11). More specifically, the management server 3 acquires the game link identifier Tg, FNWID_$B^x$ of the inviting user, corresponding to the invited game, and the type information AppIDb indicating the type of the invited game. By doing so, the CPU 30 functions as the invitation-offer-destination-application specific information acquiring unit 14. In this process, the CPU 30 first refers to the game invitation table TBL13 to identify a record in which a game link identifier Tg that matches the received game link identifier Tg has been recorded, and second, the CPU 30 records the received FNWID_B$^x$ in FNWID_To in the identified record. In this example, since FNWID_B$^x$ of the inviting user, corresponding to game B, which receives the invitation, is QWE75891, the record in the game invitation table TBL13 shown in FIG. 11A is changed to that shown in FIG. 11B. By doing so, FNWID_A$^x$ of the inviting user X, corresponding to the inviting game A, can be associated with FNWID_B$^x$ of the inviting user X, corresponding to the invited game B. In other words, the CPU 30 functions as the management unit 15, which associates and manages FNWID_From and FNWID_To for which the game link identifier Tg issued by the issuing unit 12 and the game link identifier Tg acquired by the invitation-offer-destination-application specific information acquiring unit 14 match.

In this manner, the management server 3 can associate the account in application A (game A) and the account in application B (game B) of the inviting user by using the functions as the invitation-offer-source-application specific information acquiring unit 11, the issuing unit 12, the identifier reporting unit 13, the invitation-offer-destination-application specific information acquiring unit 14, and the management unit 15. Therefore, it is possible to provide a user who makes an invitation (inviting user) with a candidate user who receives the invitation (a user to be invited).

Referring back to FIG. 9B, the description restarts. Then, the management server 3 refers to the user information table TBL11 and the friendship relation table TBL12 to acquire FNWID_B$^y$ and a nickname of friend Y of the inviting user, corresponding to the invited game B. If the inviting user has a plurality of friends, FNWID_B$^y$ and a nickname are acquired for each of the plurality of friends Y (Sb12).

Then, the management server 3 issues a different user link identifier Tu for each friend (Sb13). In addition, the management server 3 records the type information AppIDa in AppID_From, the type information AppIDb in AppID_To, the friend network identification information FNWID_B$^x$ in FNWID_From, the friend network identification information FNWID_B$^y$ in FNWID_To, a nickname Name B$^x$ in Name From, a nickname Name_B$^y$ in Name_To, an initial value of "0" in the state information St, and the current date in the date information Date, in association with the user link identifier Tu in the user invitation table TBL14 (Sb14).

For example, it is assumed that the type information AppIDa of the inviting game, indicating the game type of game A, which make an invitation, is "00000001", that the type information AppIDb of the invited game, indicating the game type of game B, which receives the invitation, is "00000002", that FNWID_B$^x$ of the inviting user X, corresponding to the invited game, is "XCV56714", and that FNWID_B$^y$ of friends Y, corresponding to the invited game, are "SDC89659", "POL45638", and "DFG78410". In this case, the corresponding records are those having record identification information IDs of "1", "2", and "3" shown in FIG. 7. More specifically, a user link identifier Tu is issued for each of users who are candidate users to be invited, user information that includes the user link identifiers Tu is reported to game B, which receives the invitation, and the management unit 15 accumulates invitation information in the user invitation table TBL14 and manages the information according to the user link identifiers Tu included in the invitation requests. In other words, users who are candidate users to be invited are managed using the user link identifiers Tu.

The nickname Name_To of the user to be invited, corresponding to the invited game, is acquired by reading the nickname recorded in the user information table TBL11, corresponding to the same FNWID as FNWID_To.

Then, the management server 3 generates a list of user link identifiers Tu and nicknames (Sb15). The management server 3 reads and acquires the nickname Name_To corresponding to InviteFNWID_To of the users to be invited from the user invitation table TBL14. Then, the management server 3 sends a friend list response that includes the above list to the terminal apparatus 2a. The list corresponds to the user information of users who have friendship relations with the inviting user in game B, which is the invited application, and who are candidate users to be invited. Therefore, the CPU 30 functions as the invitation-offer-destination-user information reporting unit 16, which reports user information to game B, which is the invited application.

Since the management server 3 functions as the invitation-offer-destination-user information reporting unit 16 in this way, it is possible to provide a user who makes an invitation (inviting user) with a candidate user who receives the invitation (a user to be invited).

Here, the users who are candidate users to be invited have friendship relations with the inviting user in game B, which is the invited application. Therefore, in some cases, the users who are candidate users to be invited may include a user who has already used game A, which is the inviting application. This is because, since FNWIDs in game A and FNWIDs in game B are not necessarily associated for candidate users to be invited, the candidates are selected regardless of whether the candidate users play game A. Therefore, even when the inviting user invites a candidate user to be invited, to game A, if that candidate user to be invited has already played game A, this invitation is not possible.

Alternatively, the CPU 30 may refer to the user invitation table TBL14 to extract a user whose FNWID in game A and whose FNWID in game B have been associated, among users who have friendship relations with the inviting user in game B and may exclude the extracted user from candidate users to be invited. In other words, the CPU 30 may be configured such that, when it is determined that a user has already played game A among users who have friendship relations with the inviting user in game B, that user is excluded from candidate users to be invited; when it is not determined that a user has already played game A, that user is extracted as a candidate user to be invited.

Figure 12:
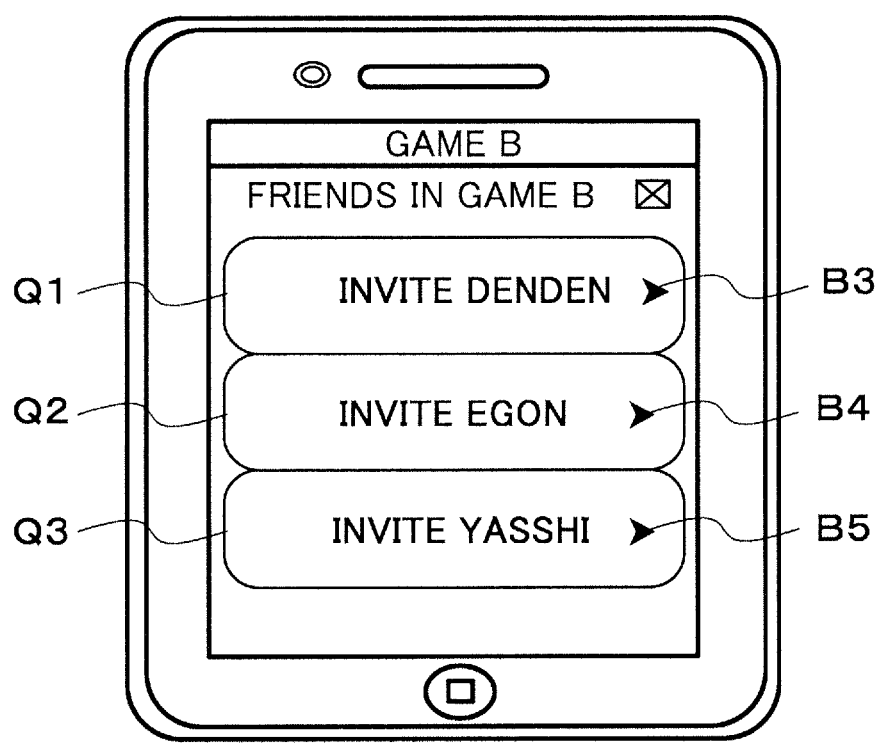
FIG. 12 is a view showing an example friend-list display screen.
Figure 13:
FIG. 13 is a view showing an example confirmation screen.

The terminal apparatus 2a receives the friend list response and acquires the nickname and the user link identifier Tu assigned to each of friends of the inviting user, who are candidate users to be invited (Sa12). In other words, the CPU 20 functions as the invitation-offer-destination-user information receiving section 209, which receives the user information reported from the management server. Then, the terminal apparatus 2a displays the friend list on the display device 25 (Sa13). FIG. 12 shows an example screen for displaying the friend list. Areas Q1, Q2, and Q3 show the nicknames of the friends and also buttons B3, B4, and B5. When the inviting user clicks on any of the buttons B3, B4, and B5, a confirmation screen appears. When the inviting user clicks on the button B4, for example, the confirmation screen shown in FIG. 13 is displayed on the display device 25. When the inviting user clicks on "Invite" on the confirmation screen, the friend to be invited is selected (Sa14). On the other hand, when the inviting user clicks on "Cancel" on the confirmation screen, the friend list screen is displayed again.

When a friend to be invited is selected, the terminal apparatus 2a sends an invitation request that includes the user link identifier Tu corresponding to the selected friend, to the management server 3 (Sa15). On this occasion, when a plurality of friends are invited, a plurality of invitation requests are sent. When the management server 3 receives the invitation request, the management server 3 acquires the user link identifier Tu of the user to be invited, included in the invitation request (Sb16), and updates the user invitation table TBL14 (Sb17). For example, when it is assumed that the user link identifier Tu of the user to be invited is "001xx0022", the record having a record identification information ID of "2" is updated from the not-yet-offered state, where the state information St is "0", as shown in section (A) of FIG. 14 to the offer pending state, where the state information St is "1", as shown in section (B). In other words, the CPU 30 functions as the management unit 15, which receives the invitation request, accumulates the invitation information (St=1) indicating that the inviting user invites the user to be invited to game A, which is the inviting game, in the user invitation table TBL14, and manages the information. The user invitation table TBL14 functions as the accumulator 17.

2.2 Processing at Side of the User to be Invited

Figure 15A:
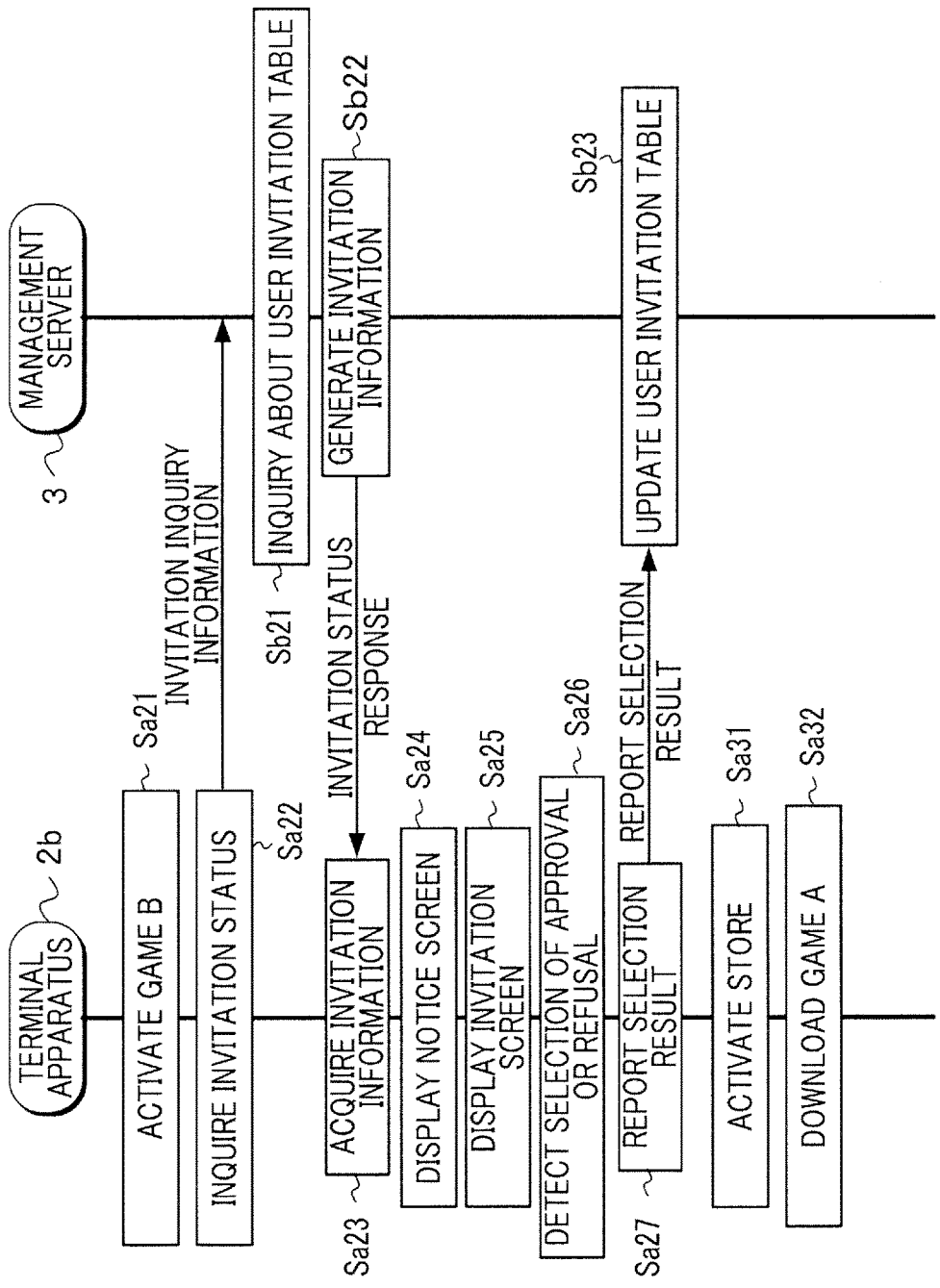
FIG. 15A is a sequence chart showing details of processing at the side of a user to be invited.

FIGS. 15A and 15B show details of the processing at the side of the user to be invited. In this example, it is assumed that the symbol of the terminal apparatus of the user to be invited is "213" and the user to be invited in game B, which receives the invitation, is invited to game A, which is the inviting game. In the following description, the CPU 30 executes processing in the management server 3, and the CPU 20 executes processing in the terminal apparatus 2b.

As shown in FIG. 15A, when the user to be invited operates the terminal apparatus 2b to activate game B to play it (Sa21), the terminal apparatus 2b sends invitation inquiry information inquiring about the invitation status to the management server 3 (Sa22). The invitation inquiry information includes the type information AppIDb of game B and $FNWID\_B^y$ of the user to be invited Y, corresponding to game B. Here, the CPU 20 of the terminal apparatus 2b functions as the inquiry unit 201, which inquires whether an invitation is made to an application that has not yet been used in the terminal apparatus 2b among the plurality of applications (game A, game B, game C, . . . ) provided by the application system 100, the inquiry being sent from game B, which is an application being used in the terminal apparatus 2b.

When the management server 3 receives the invitation inquiry information, the management server 3 inquires at the user invitation table TBL14 (Sb21). Here, the CPU 30 functions as the invitation request receiving unit 18A, which acquires the invitation inquiry information in response to an inquiry request sent from a game used by a user, by receiving the invitation inquiry information.

When it is assumed that the type information AppIDb included in the invitation inquiry information is "00000002" and that $FNWID\_B^y$ of the user to be invited, corresponding to game B is "POL45638", the CPU 30 extracts the record in which AppID_To=00000002, FNWID_To=POL45638, and St=1 (offer pending) in the process of Sb21. Then, the CPU 30 generates invitation information according to the extracted record (Sb22), and sends an invitation status response that includes the invitation information to the terminal apparatus 2b. If a corresponding record is not found, an invitation status response indicating that there is no invitation information will be sent. The invitation information includes the user link identifier Tu and the nickname Name $B^x$ of the inviting user, corresponding to the invited game. For example, when the record shown in section (B) of FIG. 14 is extracted, the user link identifier Tu is "001xx0022" and the nickname is "Karuishi".

In other words, in the process of Sb21, the CPU 30 functions as the invitation request responding unit 18B, which reports, when invitation information that matches the invitation inquiry information is found in the invitation information accumulated in the accumulator 17, an inquiry result indicating invitation details according to the matched invitation information, as a result of the inquiry request.

When the terminal apparatus 2b receives the invitation status response, the terminal apparatus 2b acquires the invitation information included in the invitation status response (Sa23). By doing so, the CPU 20 functions as the invitation information receiving unit 202, which receives the invitation information corresponding to the inquiry.

Then, the terminal apparatus 2b displays, on the display device 25, a notice screen that reports the invitation according to the invitation information to the user to be invited (Sa24). When there is no invitation information, the processes of Sa24 and thereafter are not executed. The notice screen may be pop up while game B is being played, as shown in FIG. 16A, or may be a dedicated screen shown in FIG. 16B.

Figure 16A:
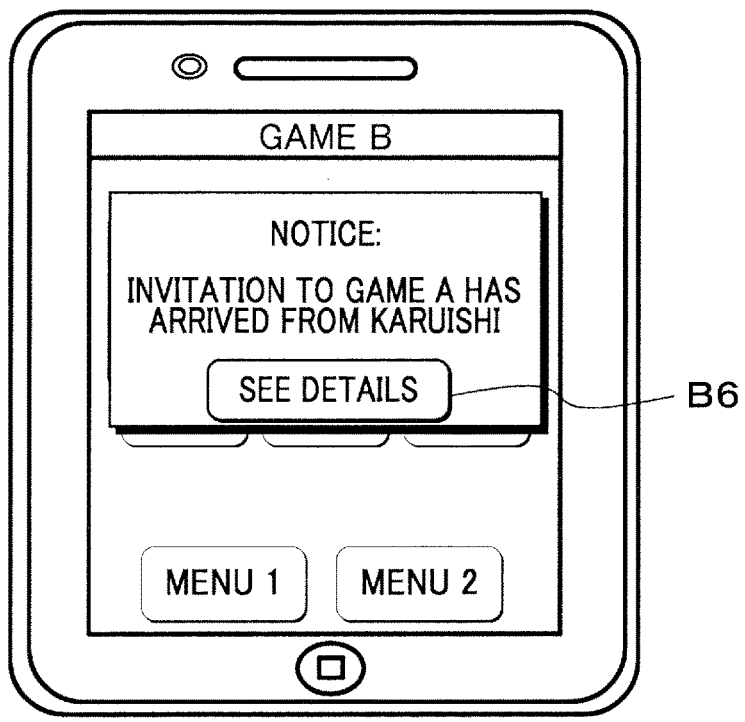
FIG. 16A is a view showing an example screen reporting an invitation with a pop-up window.
Figure 16B:
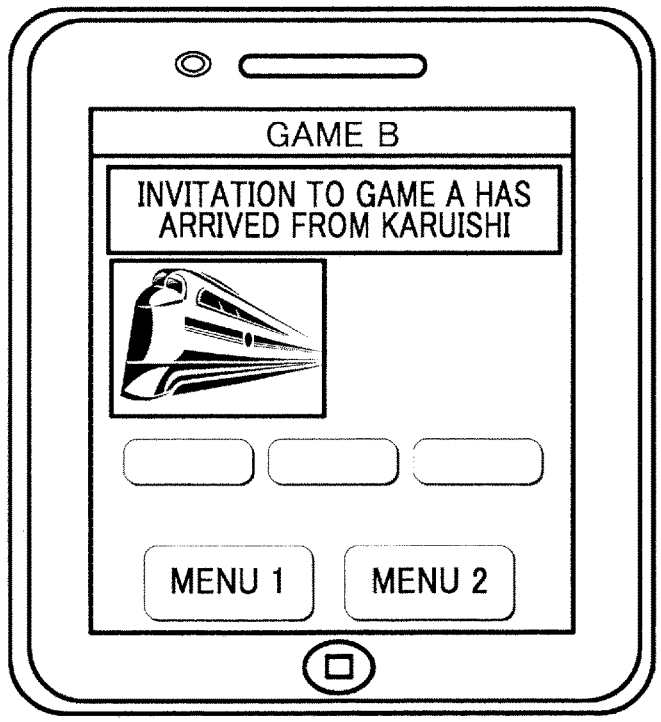
FIG. 16B is a view showing an example dedicated screen reporting an invitation.
Figure 17:
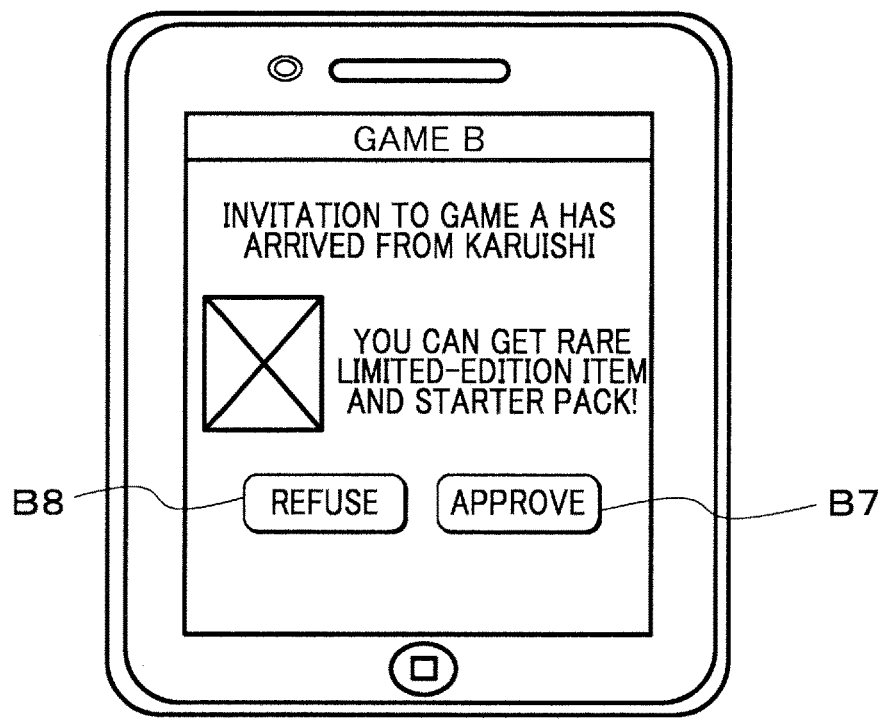
FIG. 17 is a view showing an example invitation screen.

When the user to be invited clicks on a button B6 displayed on the popup screen shown in FIG. 16A, the CPU 30 displays an invitation screen on the display device 25 (Sa25). In other words, the CPU 30 functions as the display control unit 204, which displays invitation details on the display device 25 (example display unit) according to the invitation information. FIG. 17 shows an example of the invitation screen. As shown in the figure, the invitation screen provides details of the inviting game and buttons B7 and B8 prompting the selection of one of approval and refusal.

When the user to be invited clicks on one of the buttons B7 and B8, the CPU 30 detects the selection of approval or refusal (Sa26) and sends a result notice that includes the result of selection and the user link identifier Tu to the management server 3 (Sa27). When the management server 3 receives the result notice, the management server 3 updates the user invitation table TBL14 (Sb23). More specifically, the management server 3 identifies a record that records a user link identifier Tu that matches the received user link identifier Tu and updates the state information St of the identified record. For example, when it is assumed that the user link identifier Tu is "001xx0022" and the selection result is "approval", the user invitation table TBL14 is updated from the state in which the state information St is "1", indicating offer pending, as shown in section (B) of FIG. 14, to the state in which the state information St is "2", indicating approval, as shown in section (C).

Figure 18:
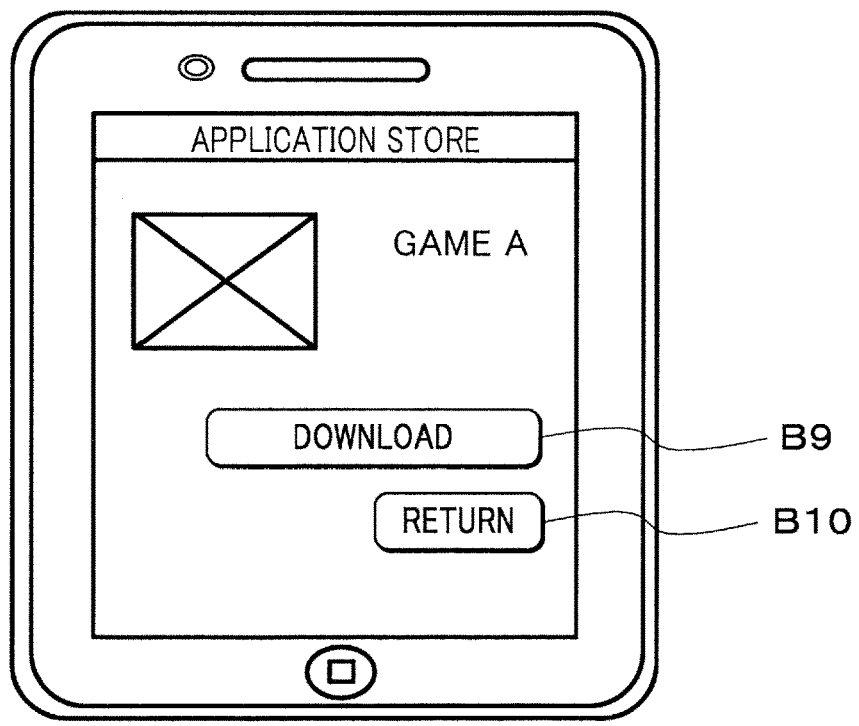
FIG. 18 is a view showing an example download screen.

Next, the terminal apparatus 2b activates a store (Sa31). More specifically, when the user to be invited selects the approval of the invitation, the terminal apparatus 2b automatically transits to a site where game A, which is the inviting game, can be downloaded. FIG. 18 shows an example of a downloading screen. When the user to be invited clicks on a button B9, game A is downloaded. When the user to be invited clicks on a button B10, the terminal apparatus 2b returns to game B. In this example, it is assumed that the user to be invited clicks on the button B9. In that case, game A is downloaded to the terminal apparatus 2b (Sa32).

Next, as shown in FIG. 15B, when game A, downloaded according to the operation of the user to be invited, is installed and activated (Sa41), a registration information input screen for membership of game A is displayed (Sa42). When the user to be invited inputs registration information and clicks on a transmission button, a registration request that includes the registration information and the user link identifier Tu is sent to the application server 4A, which provides game A. The registration information includes, for example, a nickname, a gender, an age, and an address. The user link identifier Tu is passed from game B. The user link identifier Tu is passed, for example, through a predetermined area (application share area) in the storage device 23.

When the application server 4A receives the registration information, the application server 4A executes a registration process (Sc1). The application server 4A issues a LocalID and also sends an FNWID issue request to the management server 3. When the management server 3 receives the FNWID issue request, the management server 3 issues FNWID_$A^y$ of the user to be invited Y, corresponding to game A (Sb31), and sends an FNWID issue response that includes FNWID_$A^y$ to the application server 4A.

When the application server 4A receives the FNWID issue response, the application server 4A executes an associating process for the friend network identification information FNWID of the user to be invited, corresponding to the inviting game A (Sc2). More specifically, the application server 4A generates user information in which the LocalID, the FNWID, and the registration information are associated with one another. Then, the application server 4A stores the user information in the user information table TBL11A and completes registration (Sc3). When the registration is completed, the application server 4A sends a registration completion notice to the management server 3. The registration completion notice includes the user link identifier Tu.

When the management server 3 receives the registration completion notice, the management server 3 updates the state information St in the user invitation table TBL14 (Sb32). The CPU 30 of the management server 3 identifies the record to be updated in the user invitation table TBL14 according to the user link identifier Tu and updates the state information St. For example, when it is assumed that the user link identifier Tu is "001xx0022", the state information St is updated to "4", indicating completion of registration, as shown in section (D) of FIG. 14.

Next, when the user to be invited operates the terminal apparatus 2b to complete the tutorial of game A, the application server 4A detects the completion of the tutorial (Sc4), and sends a tutorial completion notice to the management server 3. The tutorial completion notice includes the user link identifier Tu. When the management server 3 receives the tutorial completion notice, the management server 3 updates the state information St in the user invitation table TBL14 (Sb33). The CPU 30 of the management server 3 identifies the record to be updated in the user invitation table TBL14 according to the user link identifier Tu and updates the state information St. For example, when it is assumed that the user link identifier Tu is "001xx0022", the state information St is updated to "5", indicating completion of the tutorial, as shown in section (E) of FIG. 14.

Then, the management server 3 sends an incentive notice to the application server 4A. The incentive notice includes FNWID_$A^y$ of the user to be invited Y and FNWID_$A^x$ of the inviting user X. When the application server 4A receives the incentive notice, the application server 4A executes an incentive giving process for giving points or items that can be used in game A to the inviting user only or to both the inviting user and the user to be invited (Sc5).

3. Modifications

The present invention is not limited to the above-described embodiment. Various types of modifications described below are possible. It is also a matter of course that each modification and the embodiment may be combined appropriately.

(1) In the above-described embodiment, games are taken as examples of applications. The present invention is not limited to these examples. The present invention can be applied to any applications that are executed by a computer so as to be able to be used in the terminal apparatuses 2 and that forms specific relationships between users. For example, the applications may include a chatting application and a photo and video sharing application.

In the above-described embodiment, the inviting user invites a user who has a friendship relation with the inviting user in the invited game to the inviting game. A user who has a specific relationship with another user in an application, including a friendship relation, can also be invited. The specific relationship includes, for example, a friendship relation in which a user and another user help each other when executing an application, as in the above-described embodiment. The specific relationship can include a blocked relationship in which having a companion relationship is refused, or a competitor relationship in which a user considers another user to be a competitor and the approval of the other user is not necessary. For example, the specific relationship is a friend or a competitor in a game, a chatting friend in a chatting application, and a friend with whom photos and videos can be shared in a photo and video sharing application. The present invention can also be applied to an application in which the whole or a part of the services and functions provided by the application is different between users having a specific relationship and users having no specific relationship.

(2) In the above-described embodiment and modification, a friendship relation in which a user and another user help each other when executing an application is taken as an example. The present invention is not limited to this example. The present invention can be applied to a case in which a specific relationship with another user is formed in an application. The friendship relation may be established when a user asks another user to have the friendship relation and the other user approves it. The specific relationship may include, in addition to a friendship relation, a blocked relationship in which having a friendship relation is refused, or a competitor relationship in which a user considers another user to be a competitor and in which the approval of the other user is not necessary.

(3) In the above-described embodiment and modifications, the associating processing for identification information of an identical user, corresponding to two applications, is executed when another user having a friendship relation with the user in one of the applications (invited application) is invited to the other application (inviting application). The present invention is not limited to this case. The relationship of inviting and being invited is not necessary required between applications. More specifically, the above-described associating processing can be recognized as identification-information associating processing that associates, in a case in which the same user has different identical information in a plurality of applications, the different identical information. In other words, it is also possible to recognize that the present invention provides an identification-information associating method in a management server 3 that manages type information (AppID) of each of game A, game B, game C, . . . (examples of a plurality of applications) to be managed and that can communicate with a terminal apparatus 2 of a user, the identification-information associating method including: acquiring, from game A (example of a first application) installed in the terminal apparatus 2 of user P (example of a first user), application specific information (example of first information) that includes type information AppIDa identifying game A and FNWID_$A^P$ of user P, corresponding to game A (example of identification information of the first user, corresponding to the first application); issuing a game link identifier Tg (example of an application link identifier) associated with the application specific information; reporting the issued game link identifier Tg to game A used by user P; acquiring application specific information (example of second information) that includes the game link identifier Tg passed from game A to game B (example of a second application), type information AppIDb specifying game B, and FNWID_$B^P$ of user P, corresponding to game B (example of identification information of the first user, corresponding to the second application), from game B; and managing FNWID_$A^P$ of the user, corresponding to game A, and FNWID_$B^P$ of the user, corresponding to game B, for which the issued game link identifier Tg matches the acquired game link identifier Tg, FNWID_$A^P$ and FNWID_$B^P$ being associated with each other. The identification-information associating method can be controlled by the management server 3, or the identification-information associating method can be used by the computer of the management server 3.

The following aspects of the invention are understood from the embodiments and modifications described in the foregoing.

From the foregoing description, in one aspect, it can be understood that the present invention provides a management apparatus that manages type information of each of a plurality of applications to be managed and that can communicate with a terminal apparatus of a user. The management apparatus includes an invitation-offer-source-application specific information acquiring unit configured to acquire, from an inviting application used in a terminal apparatus of an inviting user, invitation-offer-source-application specific information that includes type information specifying the inviting application and identification information of the inviting user, the identification information corresponding to the inviting application; an issuing unit configured to issue an application link identifier associated with the invitation-offer-source-application specific information; an identifier reporting unit configured to report the application link identifier issued by the issuing unit to the inviting application used in the terminal apparatus of the inviting user; an invitation-offer-destination-application specific information acquiring unit configured to acquire, from an invited application, invitation-offer-destination-application specific information that includes the application link identifier passed from the inviting application to the invited application, type information specifying the invited application, and identification information of the inviting user, the identification information corresponding to the invited application; and a management unit configured to manage, in association with each other, the identification information of the inviting user, corresponding to the inviting application, and the identification information of the inviting user, corresponding to the invited application, for which the application link identifier issued by the issuing unit matches the application link identifier acquired by the invitation-offer-destination-application specific information acquiring unit.

In a non-limiting embodiment of the present invention, the management server 3, as the management apparatus, manages type information AppIDs respectively for each of applications, games A, B, C, . . . and can communicate with the terminal apparatus of a user. The management server 3 includes an invitation-offer-source-application specific information acquiring unit 11 that acquires, from game A used in the terminal apparatus 2 of user A, invitation-offer-source-application specific information that includes type information AppIDa specifying game A, which is the inviting application and FNWIDa of user A, who is the inviting user, corresponding to game A; an issuing unit 12 that issues a game link identifier Tg, as the application link identifier, associated with the invitation-offer-source-application specific information; an identifier reporting unit 13 that reports the game link identifier Tg issued by the issuing unit 12 to game A used in the terminal apparatus 2 of user A; an invitation-offer-destination-application specific information acquiring unit 14 that acquires, from game B, which is an invited application, invitation-offer-destination-application specific information that includes the game link identifier Tg passed from game A to game B, type information AppIDb specifying game B, which is an invited application, and FNWIDb, which is identification information of the inviting user corresponding to the invited application; and a management unit 15 that manages FNWIDa and FNWIDb when the game link identifier Tg issued by the issuing unit 12 matches the game link identifier Tg acquired by the invitation-offer-destination-application specific information acquiring unit 14.

It is preferable that the above-described management apparatus manage a specific relationship between users in each of the plurality of applications, and further include an invitation-offer-destination user information reporting unit configured to report, to the invited application, user information of at least one user who is a candidate user to be invited and who has the specific relationship with the inviting user in the invited application.

In a preferred mode of the embodiment, the management manager 3 manages a specific relationship between users in each of games A, B, C, . . . and further includes an invitation-offer-destination user information reporting unit 16 that reports, to game B, user information of at least one user who is a candidate user to be invited and who has the specific relationship with user A in game B It is preferable that the above-described management apparatus receive an invitation request indicating an invitation to the inviting application for a user to be invited selected by the inviting user from among at least one candidate user to be invited, indicated by the user information reported by the invitation-offer-destination user information report unit; accumulate, in an accumulator, invitation information indicating that the inviting user invites the user to be invited to the inviting application; and manage the invitation information.

In a preferred mode, the management server 3 receives an invitation request indicating an invitation to game A for user B, who is a user to be invited selected by the inviting user from among at least one candidate user to be invited, indicated by the user information reported by the invitation-offer-destination user information report unit; accumulates, in the accumulator 17, invitation information indicating that user A invites user B to user A; and manages the invitation information.

It is preferable that, in the above-described management apparatus, the invitation-offer-destination user information reporting unit issue a user link identifier for each user who is the candidate user to be invited, and report the user information that includes the user link identifier to the invited application; and the management unit accumulate the invitation information in the accumulator and manage the invitation information, on the basis of the user link identifier included in the invitation request.

In a preferred mode, the invitation-offer-destination user information reporting unit 16 issues a user link identifier Tu for each user who is the candidate user to be invited, and reports the user information that includes the user link identifier Tu to game A; and the management unit 15 accumulates the invitation information in the accumulator 17 and manages the invitation information, on the basis of the user link identifier Tu included in the invitation request.

It is preferable that the above-described management apparatus further include an invitation request receiving unit configured to acquire, in response to an inquiry request sent from any of the plurality of applications, invitation inquiry information that includes type information specifying the application and identification information of the user, the identification information corresponding to the application; and an invitation request responding unit configured to report to the application that has made the inquiry request, in a case in which the invitation information accumulated in the accumulator includes invitation information that matches the invitation inquiry information, an inquiry result indicating details of an invitation according to the invitation information as a result of the inquiry request.

In a preferred embodiment, the management server 3 further includes an invitation request receiving unit 18A that acquires, in response to an inquiry request sent from any of games A, B, C, . . . invitation inquiry information that includes type information AppID specifying the game that has made the inquiry request and FNWID of the user corresponding to the game, which has made the inquiry request; and an invitation request responding unit 18B that reports to the game in a case in which the invitation information accumulated in the accumulator 17 includes invitation information that matches the invitation inquiry information, an inquiry result indicating details of an invitation according to the invitation information as a result of the inquiry request.

It is preferable that the management apparatus further include an invitation-offer-destination candidate application reporting unit configured to report at least one candidate application that is a candidate for the invited application to the inviting application in response to a request sent from the inviting application of the inviting user; and the invited application be an application selected by the inviting user from among the at least one candidate application.

In a preferred embodiment, the management server 3 additionally includes an invitation-offer-destination candidate application reporting unit 19 that reports at least one candidate application that is a candidate for the invited application to game A in response to a request sent from game A of the inviting user; and the invited application is an application selected by user A from among the at least one candidate application.

When the inviting application is game A, the candidate applications are, for example, games B, C, . . . excluding game A. The invited application is selected by user A, who is an inviting user, from among games B, C, . . . . Thus, any of the candidate applications (any of game B, C, . . . ) can be the invited application.

In another aspect, it can also be understood that, the present invention provides an application system that includes a management apparatus that manages type information of each of a plurality of applications to be managed; and a terminal apparatus of a user. The management apparatus includes an invitation-offer-source-application specific information acquiring unit configured to acquire, from an inviting application used in a terminal apparatus of an inviting user, invitation-offer-source-application specific information that includes type information specifying the inviting application and identification information of the inviting user, the identification information corresponding to the inviting application; an issuing unit configured to issue an application link identifier associated with the invitation-offer-source-application specific information; an identifier reporting unit configured to report the application link identifier issued by the issuing unit to the inviting application used in the terminal apparatus of the inviting user; an invitation-offer-destination-application specific information acquiring unit configured to acquire, from an invited application, invitation-offer-destination-application specific information that includes the application link identifier passed from the inviting application to the invited application, type information specifying the invited application, and identification information of the inviting user, the identification information corresponding to the invited application; and a management unit configured to manage, in association with each other, the identification information of the inviting user, corresponding to the inviting application, and the identification information of the inviting user, corresponding to the invited application, for which the application link identifier issued by the issuing unit matches the application link identifier acquired by the invitation-offer-destination-application specific information acquiring unit. The terminal apparatus includes an invitation-offer-source-application specific information sending unit configured to send to the management apparatus the invitation-offer-source-application specific information generated by the inviting application used in the terminal apparatus of the inviting user; an activation unit configured to acquire the application link identifier reported from the management apparatus and that activates the invited application so as to pass the application link identifier from the inviting application to the invited application; and an invitation-offer-destination-application specific information sending unit configured to send to the management apparatus the invitation-offer-destination application specific information that includes the application link identifier acquired from the inviting application.

In a non-limiting embodiment of the present invention, the application system 100 includes the management server 3 apparatus that manages type information AppIDs for games A, B, C, . . . ; and the terminal apparatus 2 of a user. The management server 3 includes an invitation-offer-source-application specific information acquiring unit 11 that acquires, from game A used in the terminal apparatus 2 of user A, invitation-offer-source-application specific information that includes type information AppIDa specifying game A, which is the inviting application and FNWIDa of user A, who is the inviting user, corresponding to game A; an issuing unit 12 that issues a game link identifier Tg, as the application link identifier, associated with the invitation-offer-source-application specific information; an identifier reporting unit 13 that reports the game link identifier Tg issued by the issuing unit 12 to game A used in the terminal apparatus 2 of user A; an invitation-offer-destination-application specific information acquiring unit 14 that acquires, from game B, invitation-offer-destination-application specific information that includes the game link identifier Tg passed from game A to game B, type information AppIDb specifying game B, which is an invited application, and FNWIDb, which is identification information of the inviting user corresponding to the invited application; and a management unit 15 that manages FNWIDa and FNWIDb when the game link identifier Tg issued by the issuing unit 12 matches the game link identifier Tg acquired by the invitation-offer-destination-application specific information acquiring unit 14. The terminal apparatus 2 includes an invitation-offer-source-application specific information sending unit 206 that sends to the management server 3 the invitation-offer-source-application specific information generated by game A used in the terminal apparatus 2 of user A; an activation unit 207 that acquires the game link identifier Tg reported from the management server 3 and that activates the invited application so as to pass the game link identifier Tg from game A to game B; and an invitation-offer-destination-application specific information sending unit 208 that sends to the management server 3 the invitation-offer-destination application specific information that includes the game link identifier Tg acquired from game A.

It is preferable that, in the above-described application system, the management apparatus manage a specific relationship between users in each of the plurality of applications, and further include an invitation-offer-destination user information reporting unit configured to report, to the invited application of the terminal apparatus of the inviting user, user information of at least one user who is a candidate user to be invited and who has the specific relationship with the inviting user in the invited application; and the terminal apparatus further include an invitation-offer-destination user information receiving unit configured to receive the user information reported from the management apparatus.

In a preferred mode of the embodiment, the management manager 3 manages a specific relationship between users in each of games A, B, C, . . . and further includes an invitation-offer-destination user information reporting unit 16 that reports, to game B of the terminal apparatus 2 of user A, user information of at least one user who is a candidate user to be invited and who has the specific relationship with user A in game B; and the terminal apparatus 2 further includes an invitation-offer-destination user information receiving unit 209 that receives the user information reported from the management server 3.

It is preferable that, in the above-described application system, the terminal apparatus further include an inquiry unit configured to inquire of the management apparatus from an application used in the terminal apparatus among the plurality of applications, about an invitation to an application that has not yet been used in the terminal apparatus among the plurality of applications; an invitation information receiving unit configured to receive invitation information corresponding to the inquiry; and a display control unit configured to display, on a display unit, details of the invitation according to the invitation information.

In a preferred mode of the embodiment, the terminal apparatus 2 further includes an inquiry unit 201 that inquires of the management server 3 from a game used in the terminal apparatus 2 from among games A, B, C, . . . about an invitation to a game that has not yet been used in the terminal apparatus 2 from among games A, B, C, . . . ; an invitation information receiving unit 202 configured to receive invitation information corresponding to the inquiry; and a display control unit 204 configured to display, on the display unit 203, details of the invitation according to the invitation information.

In still another aspect, it can also be understood that, the present invention provides a control method for a management apparatus that manages type information of each of a plurality of applications to be managed and that can communicate with a terminal apparatus of a user. The control method includes acquiring, from an inviting application used in a terminal apparatus of an inviting user, invitation-offer-source-application specific information that includes type information specifying the inviting application and identification information of the inviting user, the identification information corresponding to the inviting application; issuing an application link identifier associated with the invitation-offer-source-application specific information; reporting the issued application link identifier to the inviting application used in the terminal apparatus of the inviting user; acquiring, from an invited application, invitation-offer-destination-application specific information that includes the application link identifier passed from the inviting application to the invited application, type information specifying the invited application, and identification information of the inviting user, the identification information corresponding to the invited application; and managing, in association with each other, the identification information of the inviting user, corresponding to the inviting application, and the identification information of the inviting user, corresponding to the invited application, for which the issued application link identifier matches the acquired application link identifier.

In a non-limiting embodiment of the present invention, the control method is for use at the management server 3 that manages type information AppIDs of games A, B, C . . . ; that can communicate with the terminal apparatus 2. The method includes acquiring, from game A used in the terminal apparatus 2 of an inviting user, user A, invitation-offer-source-application specific information that includes type information AppIDa specifying game A, which is the inviting application, and FNWIDa of user A corresponding to game A; issuing the game link identifier Tg associated with the invitation-offer-source-application specific information; reporting the game link identifier Tg issued to game A used in the terminal apparatus 2 of user A; acquiring, from game B, which is an invited application, invitation-offer-destination-application specific information that includes the game link identifier Tg passed from game A to game B, type information AppIDb specifying game B, and FNWIDb, which is the identification information of user A corresponding to game A; and managing, in association with each other, FNWIDa and FNWIDb, for which the issued game link identifier Tg issued matches the acquired game link identifier Tg.

In yet another aspect, it can also be understood that, the present invention provides a computer-readable recording medium having recorded thereon a program for a management apparatus that manages type information of each of a plurality of applications to be managed, that can communicate with a terminal apparatus of a user, and that includes a computer. The program makes the computer execute an invitation-offer-source-application specific information acquiring process of acquiring, from an inviting application used in a terminal apparatus of an inviting user, invitation-offer-source-application specific information that includes type information specifying the inviting application and identification information of the inviting user, the identification information corresponding to the inviting application; an issuing process of issuing an application link identifier associated with the invitation-offer-source-application specific information; an identifier reporting process of reporting the application link identifier issued in the issuing process to the inviting application used in the terminal apparatus of the inviting user; an invitation-offer-destination-application specific information acquiring process of acquiring, from an invited application, invitation-offer-destination-application specific information that includes the application link identifier passed from the inviting application to the invited application, type information specifying the invited application, and identification information of the inviting user, the identification information corresponding to the invited application; and a management process of managing, in association with each other, the identification information of the inviting user, corresponding to the inviting application, and the identification information of the inviting user, corresponding to the invited application, for which the application link identifier issued in the issuing process matches the application link identifier acquired in the invitation-offer-destination-application specific information acquiring process.

The recording medium is, for example, a non-transitory recording medium, one good example of which is an optical recording medium (optical disc) such as a CD-ROM, and can include a freely selected form of publically known recording mediums such as a semi-conductor recording medium or a magnetic recording medium.

In a non-limiting embodiment of the present invention, a program is for use at the management server 3 that manages type information AppIDs of games A, B, C; that can communicate with the terminal apparatus 2, and that includes the CPU 30. The program makes the CPU 30 execute an invitation-offer-source-application specific information acquiring process of acquiring, from game A used in the terminal apparatus 2 of an inviting user, user A, invitation-offer-source-application specific information that includes type information AppIDa specifying game A, which is the inviting application, and FNWIDa of user A corresponding to game A; an issuing process of issuing the game link identifier Tg associated with the invitation-offer-source-application specific information; an identifier reporting process of reporting the game link identifier Tg issued in the issuing process to game A used in the terminal apparatus 2 of user A; an invitation-offer-destination-application specific information acquiring process of acquiring, from game B, which is an invited application, invitation-offer-destination-application specific information that includes the game link identifier Tg passed from game A to game B, type information AppIDb specifying game B, and FNWIDb, which is the identification information of user A corresponding to game A; and a management process of managing, in association with each other, FNWIDa and FNWIDb, for which the game link identifier Tg issued in the issuing process matches the game link identifier Tg acquired in the invitation-offer-destination-application specific information acquiring process.

In one aspect, it can also be understood that, the present invention provides an identification-information associating method in a management apparatus that manages type information of each of a plurality of applications to be managed and that can communicate with a terminal apparatus of a user. The identification-information associating method includes acquiring, from a first application (inviting application) installed in a terminal apparatus used by a first user (inviting user), first information (invitation-offer-source-application specific information) that includes type information specifying the first application and identification information of the first user (inviting user), the identification information corresponding to the first application; issuing an application link identifier associated with the first information; reporting the issued application link identifier to the first application (inviting application) used by the first user (inviting user); acquiring second information (invitation-offer-destination-application specific information) that includes the application link identifier passed from the first application (inviting application) to a second application (invited application) installed in the terminal apparatus, type information specifying the second application (invited application), and identification information of the first user (inviting user), the identification information corresponding to the second application (invited application), from the second application (invited application); and managing, in association with each other, the identification information of the first user (inviting user), corresponding to the first application (inviting application), and the identification information of the first user, corresponding to the second application (invited application), for which the issued application link identifier matches the acquired application link identifier.

In a non-limiting embodiment, the identification-information associating method includes acquiring, from game A as the first application (inviting application) installed in the terminal apparatus 2 used by user A, who is the first user (inviting user), first information (invitation-offer-source-application specific information) that includes type information AppIDa specifying game A and FNWIDa, which is identification information of user A corresponding to game A; issuing the game link identifier Tg associated with the first information; reporting the issued game link identifier Tg to game A used by user A; acquiring, from game B, second information (invitation-offer-destination-application specific information) that includes the game link identifier Tg passed from game A to game B, which is the second application (invited application) installed in the terminal apparatus 2, type information AppIDb specifying game B and FNWIDb of the user A corresponding to game B; and managing, in association with each other, FNWIDa and FNWIDb, for which the issued application link identifier matches the acquired application link identifier.

REFERENCE NUMERALS

1: Communication network
2: Terminal apparatus
3: Server
4A, 4B, 4C: Application servers
TBL11: User information table
TBL12: Friendship relation table
TBL13: Game invitation table
TBL14: User invitation table
11: Invitation-offer-source-application specific information acquiring unit
12: Issuing unit
13: Identifier reporting unit
14: Invitation-offer-destination-application specific information acquiring unit
15: Management unit
16: Invitation-offer-destination-user information reporting unit
17: Accumulator
18A: Invitation request receiving unit
18B: Invitation request responding unit
19: Invitation-offer-destination candidate application reporting unit
30: CPU
100: Application system
201: Inquiry unit
202: Invitation information receiving unit 203: Display unit
204: Display control unit
205: Storage unit
206: Invitation-offer-source-application specific information sending unit
207: Activation unit
208: Invitation-offer-destination-application specific information sending unit
209: Invitation-offer-destination user information receiving unit

What is claimed is:

1. A management apparatus that manages type information of each of a plurality of applications to be managed and that can communicate with a terminal apparatus of a user, the management apparatus comprising:
at least one processor configured to execute:
an invitation-offer-source-application specific information acquiring unit configured to acquire, from an inviting application used in a terminal apparatus of an inviting user, invitation-offer-source-application specific information that includes type information specifying the inviting application and identification information of the inviting user, the identification information corresponding to the inviting application;
an issuing unit configured to issue an application link identifier associated with the invitation-offer-source-application specific information;
an identifier reporting unit configured to report the application link identifier issued by the issuing unit to the inviting application used in the terminal apparatus of the inviting user;
an invitation-offer-destination-application specific information acquiring unit configured to acquire, from an invited application, invitation-offer-destination-application specific information that includes the application link identifier passed from the inviting application to the invited application in the terminal apparatus, type information specifying the invited application, and identification information of the inviting user, the identification information corresponding to the invited application;
a management unit configured to associate with each other, the identification information of the inviting user, corresponding to the inviting application, and the identification information of the inviting user, corresponding to the invited application, after the application link identifier is passed from the inviting application to the invited application, when the application link identifier issued by the issuing unit matches the application link identifier acquired by the invitation-offer-destination-application specific information acquiring unit; and
an invitation-offer-destination user information reporting unit configured to report, to the invited application, user information of at least one user who is a candidate user to be invited and who has a specific relationship with the inviting user in the invited application based on the application link identifier.

2. The management apparatus according to claim 1, wherein the management apparatus manages specific relationships between users in each of the plurality of applications.

3. The management apparatus according to claim 2, wherein the management unit receives an invitation request indicating an invitation to the inviting application for a user to be invited selected by the inviting user from among at least one candidate user to be invited, indicated by the user information reported by the invitation-offer-destination user information report unit; accumulates, in an accumulator, invitation information indicating that the inviting user invites the user to be invited to the inviting application; and manages the invitation information.

4. The management apparatus according to claim 3, wherein the invitation-offer-destination user information reporting unit issues a user link identifier for each user who is the candidate user to be invited, and reports the user information that includes the user link identifier to the invited application; and
the management unit accumulates the invitation information in the accumulator and manages the invitation information, on the basis of the user link identifier included in the invitation request.

5. The management apparatus according to claim 3, wherein the at least one processor is further configured to execute:
an invitation request receiving unit configured to acquire, in response to an inquiry request sent from any of the plurality of applications, invitation inquiry information that includes type information specifying the application and identification information of the user, the identification information corresponding to the application; and
an invitation request responding unit configured to report to the application that has made the inquiry request, in a case in which the invitation information accumulated in the accumulator includes invitation information that matches the invitation inquiry information, an inquiry result indicating details of an invitation according to the invitation information as a result of the inquiry request.

6. The management apparatus according to claim 1, wherein the at least one processor is further configured to execute an invitation-offer-destination candidate application reporting unit configured to report at least one candidate application that is a candidate for the invited application to the inviting application in response to a request sent from the inviting application of the inviting user; and
the invited application is an application selected by the inviting user from among the at least one candidate application.

7. An application system comprising:
a management apparatus that manages type information of each of a plurality of applications to be managed; and
a terminal apparatus of a user;
the management apparatus comprising:
at least one first processor further configured to execute:
an invitation-offer-source-application specific information acquiring unit configured to acquire, from an inviting application used in a terminal apparatus of an inviting user, invitation-offer-source-application specific information that includes type information specifying the inviting application and identification information, of the inviting user, the identification information corresponding to the inviting application;
an issuing unit configured to issue an application link identifier associated with the invitation-offer-source-application specific information;
an identifier reporting unit configured to report the application link identifier issued by the issuing unit to the inviting application used in the terminal apparatus of the inviting user;
an invitation-offer-destination-application specific information acquiring unit configured to acquire, from an invited application, invitation-offer-destination-application specific information that includes the application link identifier passed from the inviting application to the invited application in the terminal apparatus, type information specifying the invited application, and identification information of the inviting user, the identification information corresponding to the invited application;

a management unit configured to associate with each other, the identification information of the inviting user, corresponding to the inviting application, and the identification information of the inviting user, corresponding to the invited application, after the application link identifier is passed from the inviting application to the invited application, when the application link identifier issued by the issuing unit matches the application link identifier acquired by the invitation-offer-destination-application specific information acquiring unit; and an invitation-offer-destination user information reporting unit configured to report, to the invited application of the terminal apparatus of the inviting user, user information of at least one user who is a candidate user to be invited and who has a specific relationship with the inviting user in the invited application based on the application link identifier; and the terminal apparatus comprising:

an invitation-offer-source-application specific information sending unit configured to send to the management apparatus the invitation-offer-source-application specific information generated by the inviting application used in the terminal apparatus of the inviting user;

an activation unit configured to acquire the application link identifier reported from the management apparatus and that activates the invited application so as to pass the application link identifier from the inviting application to the invited application; and an invitation-offer-destination-application specific information sending unit configured to send to the management apparatus the invitation-offer-destination application specific information that includes the application link identifier acquired from the inviting application.

8. The application system according to claim 7,
wherein the management apparatus manages specific relationships between users in each of the plurality of applications; and
the terminal apparatus further comprises an invitation-offer-destination user information receiving unit configured to receive the user information reported from the management apparatus.

9. The application system according to claim 7, wherein the terminal apparatus further comprises:
at least one second processor is configured to execute:
an inquiry unit configured to inquire of the management apparatus from an application used in the terminal apparatus among the plurality of applications, about an invitation to an application that has not yet been used in the terminal apparatus among the plurality of applications;
an invitation information receiving unit configured to receive invitation information corresponding to the inquiry; and
a display control unit configured to display, on a display unit, details of the invitation according to the invitation information.

10. A control method for a management apparatus that manages type information of each of a plurality of applications to be managed and that can communicate with a terminal apparatus of a user, the control method comprising:

acquiring, from an inviting application used in a terminal apparatus of an inviting user, invitation-offer-source-application specific information that includes type information specifying the inviting application and identification information of the inviting user, the identification information corresponding to the inviting application;

issuing an application link identifier associated with the invitation-offer-source-application specific information;

reporting the issued application link identifier to the inviting application used in the terminal apparatus of the inviting user;

acquiring, from an invited application, invitation-offer-destination-application specific information that includes the application link identifier passed from the inviting application to the invited application in the terminal apparatus, type information specifying the invited application, and identification information of the inviting user, the identification information corresponding to the invited application;

associating with each other, the identification information of the inviting user, corresponding to the inviting application, and the identification information of the inviting user, corresponding to the invited application, after the application link identifier is passed from the inviting application to the invited application, when the issued application link identifier matches the acquired application link identifier; and reporting, to the invited application, user information of at least one user who is a candidate user to be invited and who has a specific relationship with the inviting user in the invited application based on the application link identifier.

11. A non-transitory computer-readable recording medium having recorded thereon a program for a management apparatus that manages type information of each of a plurality of applications to be managed, that can communicate with a terminal apparatus of a user, and that comprises a computer, the program making the computer execute:

an invitation-offer-source-application specific information acquiring process of acquiring, from an inviting application used in a terminal apparatus of an inviting user, invitation-offer-source-application specific information that includes type information specifying the inviting application and identification information of the inviting user, the identification information corresponding to the inviting application;

an issuing process of issuing an application link identifier associated with the invitation-offer-source-application specific information;

an identifier reporting process of reporting the application link identifier issued in the issuing process to the inviting application used in the terminal apparatus of the inviting user;

an invitation-offer-destination-application specific information acquiring process of acquiring, from an invited application, invitation-offer-destination-application specific information that includes the application link identifier passed from the inviting application to the invited application in the terminal apparatus, type information specifying the invited application, and identification information of the inviting user, the identification information corresponding to the invited application;

a management process of associating with each other, the identification information of the inviting user, corresponding to the inviting application, and the identification information of the inviting user, corresponding to the invited application, after the application link identifier is passed from the inviting application to the invited application, when the application link identifier issued in the issuing process matches the application link identifier acquired in the invitation-offer-destination-application specific information acquiring process; and candidate user reporting process of reporting, to the invited application, user information of at least one user who is a candidate user to be invited and who has a specific relationship with the inviting user in the invited application based on the application link identifier.

12. An identification-information associating method in a management apparatus that manages type information of each of a plurality of applications to be managed and that can communicate with a terminal apparatus of a user, the identification-information associating method comprising:

acquiring, from a first application installed in a terminal apparatus used by a first user, first information that includes type information specifying the first application and identification information of the first user, the identification information corresponding to the first application;

issuing an application link identifier associated with the first information;

reporting the issued application link identifier to the first application used by the first user;

acquiring second information that includes the application link identifier passed from the first application to a second application installed in the terminal apparatus, type information specifying the second application, and identification information of the first user, the identification information corresponding to the second application, from the second application; and associating with each other, the identification information of the first user, corresponding to the first application, and the identification information of the first user, corresponding to the second application, after the application link identifier is passed from the inviting application to the invited application, when the issued application link identifier matches the acquired application link identifier; and candidate user reporting process of reporting, to the invited application, user information of at least one user who is a candidate user to be invited and who has a specific relationship with the inviting user in the invited application based on the application link identifier.

* * * * *